United States Patent
Kitagawa

(10) Patent No.: US 10,654,439 B2
(45) Date of Patent: May 19, 2020

(54) AIRBAG DEVICE FOR FRONT PASSENGER SEAT AND AIRBAG FOLDING METHOD

(71) Applicant: TOYOTA JIDOSHA KABUSHIKI KAISHA, Toyota-shi, Aichi-ken (JP)

(72) Inventor: Yuichi Kitagawa, Toyoto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 15/923,365

(22) Filed: Mar. 16, 2018

(65) Prior Publication Data

US 2018/0297550 A1 Oct. 18, 2018

(30) Foreign Application Priority Data

Apr. 14, 2017 (JP) .................................. 2017-080839

(51) Int. Cl.
*B60R 21/237* (2006.01)
*B60R 21/235* (2006.01)
(Continued)

(52) U.S. Cl.
CPC .......... *B60R 21/237* (2013.01); *B60R 21/231* (2013.01); *B60R 21/235* (2013.01); *B60R 21/2334* (2013.01); *B60R 21/2338* (2013.01); *B60R 21/205* (2013.01); *B60R 2021/0004* (2013.01); *B60R 2021/0009* (2013.01); *B60R 2021/0044* (2013.01); *B60R 2021/0048* (2013.01); *B60R 2021/23324* (2013.01);
(Continued)

(58) Field of Classification Search
CPC . B60R 21/237; B60R 21/231; B60R 21/2334; B60R 21/205
See application file for complete search history.

(56) References Cited

U.S. PATENT DOCUMENTS 5,022,675 A * 6/1991 Zelenak, Jr. .......... B60R 21/201
280/743.1
5,213,361 A * 5/1993 Satoh .................... B60R 21/231
280/730.1
(Continued)

FOREIGN PATENT DOCUMENTS

JP H05-092746 A 4/1993
JP 2003-335203 A 11/2003
(Continued)

*Primary Examiner* — Paul N Dickson
*Assistant Examiner* — Joselynn Y Sliteris
(74) *Attorney, Agent, or Firm* — Oliff PLC

(57) ABSTRACT

An airbag device for a passenger seat having an inflator and an airbag, wherein: the airbag includes a first structural portion that structures a left-right direction intermediate portion of the airbag and at which is formed a first surface, and second structural portions that are formed in continuation with both left and right sides of the first structural portion and at which are formed a pair of respective second surfaces that is to bulge further toward the front passenger seat side than the first surface and move apart from one another, and a connecting cloth, which connects regions that become bulging end portion sides of the pair of second surfaces in an inflated and deployed state of the airbag, and which is deployed to cover a range that is reached by the head portion and the chest portion of the passenger in the front passenger seat, is provided.

10 Claims, 22 Drawing Sheets

(51) Int. Cl.
  *B60R 21/2334* (2011.01)
  *B60R 21/2338* (2011.01)
  *B60R 21/231* (2011.01)
  *B60R 21/205* (2011.01)
  *B60R 21/233* (2006.01)
  *B60R 21/00* (2006.01)

(52) U.S. Cl.
  CPC ............... *B60R 2021/23386* (2013.01); *B60R 2021/23576* (2013.01)

(56) References Cited

U.S. PATENT DOCUMENTS

| | | | | |
|---|---|---|---|---|
| 5,324,070 | A * | 6/1994 | Kitagawa | B60R 21/206 280/730.1 |
| 6,672,618 | B2 * | 1/2004 | Keshavaraj | B60R 21/231 280/743.1 |
| 6,837,517 | B2 * | 1/2005 | Keshavaraj | B60R 21/231 280/743.1 |
| 7,048,304 | B1 * | 5/2006 | Keshavaraj | B60R 21/231 280/743.1 |
| 7,195,275 | B2 * | 3/2007 | Abe | B60R 21/231 280/729 |
| 8,517,415 | B2 * | 8/2013 | Iida | B60R 21/237 280/728.3 |
| 8,544,882 | B2 * | 10/2013 | Gulde | B60R 21/231 280/732 |
| 8,678,429 | B2 * | 3/2014 | Nagasawa | B60R 21/233 280/729 |
| 9,421,940 | B2 * | 8/2016 | Lee | B60R 21/231 |
| 9,566,929 | B1 * | 2/2017 | Belwafa | B60R 21/205 |
| 10,183,645 | B2 * | 1/2019 | Rose | B60R 21/01552 |
| 10,343,641 | B2 * | 7/2019 | Abramoski | B60R 21/233 |
| 2003/0218325 | A1 | 11/2003 | Hasebe et al. | |
| 2006/0028009 | A1 | 2/2006 | Hasebe et al. | |
| 2016/0250993 | A1 | 9/2016 | Nagatani et al. | |
| 2018/0134244 | A1 * | 5/2018 | Choi | B60R 21/2338 |
| 2019/0054883 | A1 * | 2/2019 | Kitagawa | B60R 21/206 |

FOREIGN PATENT DOCUMENTS

| | | |
|---|---|---|
| JP | 2009-006924 A | 1/2009 |
| JP | 2014-051152 A | 3/2014 |
| JP | 2016-016730 A | 2/2016 |

* cited by examiner

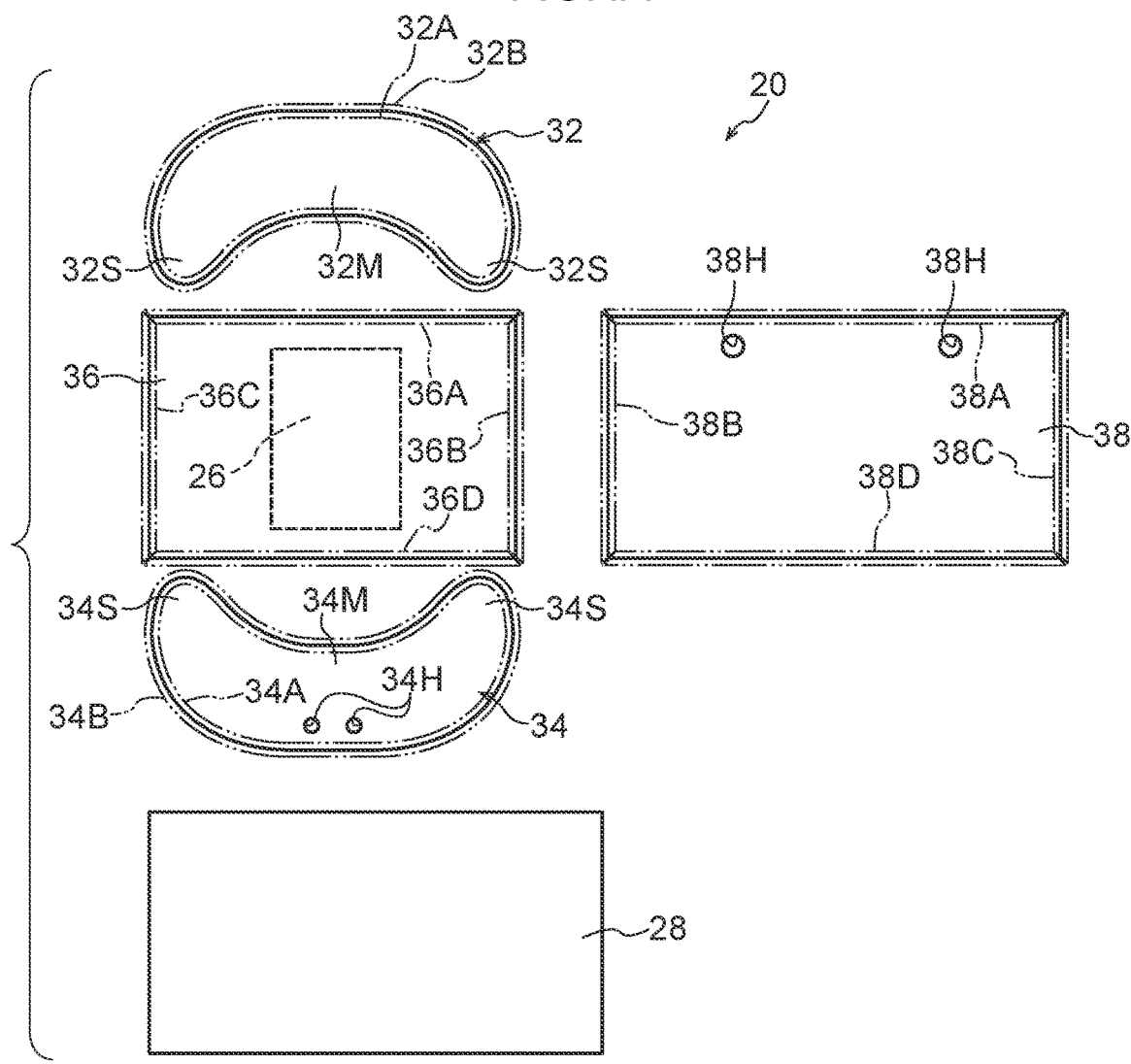
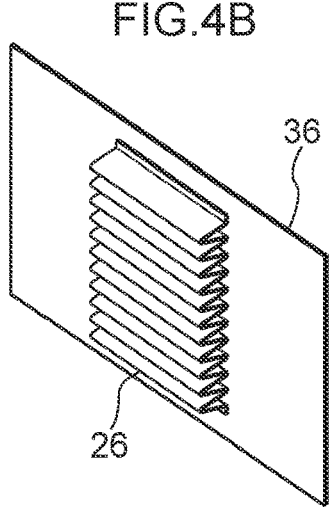

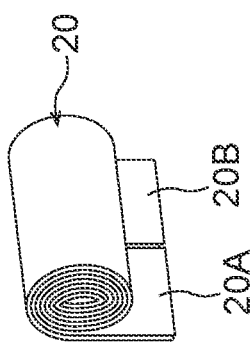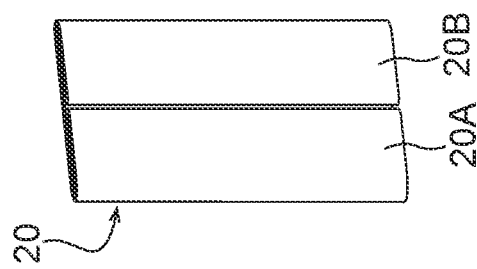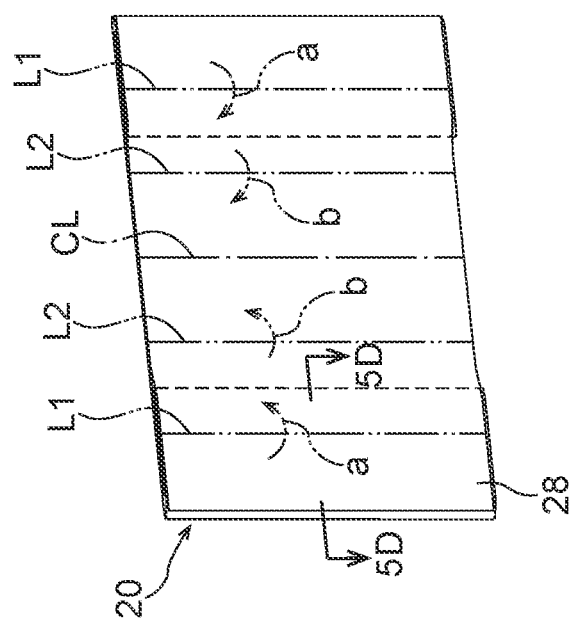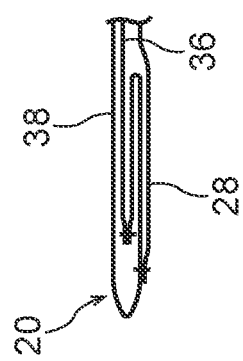

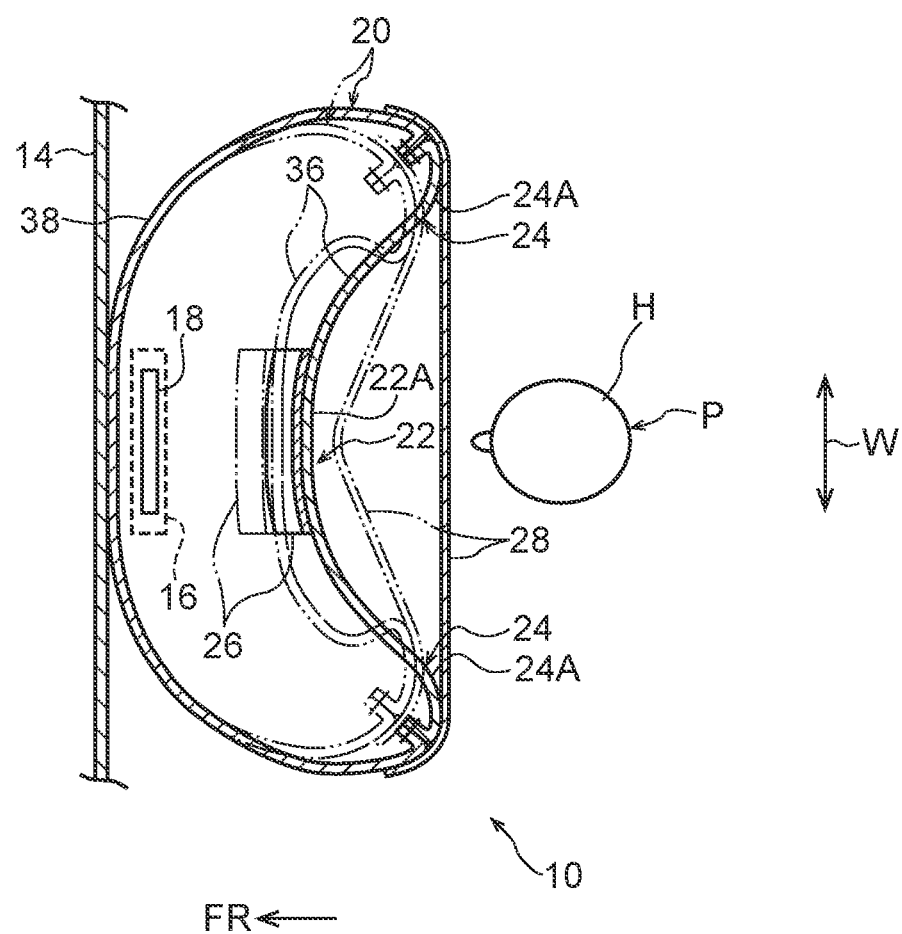

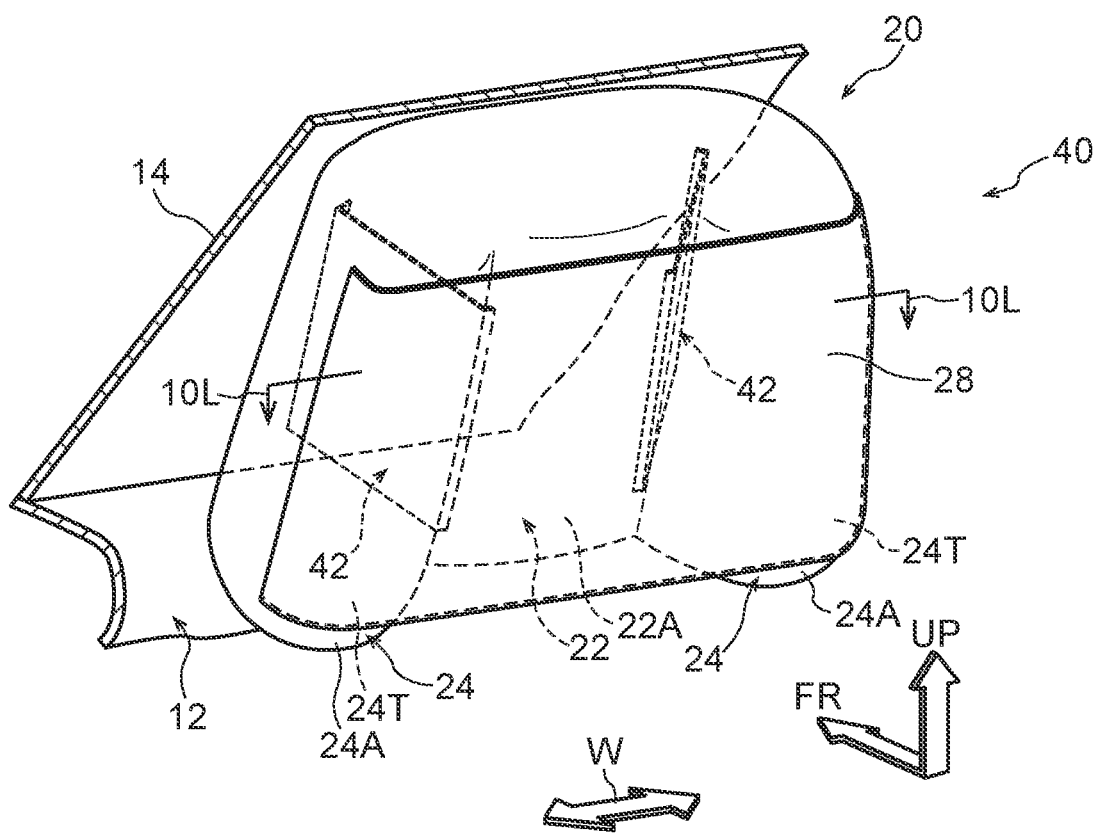

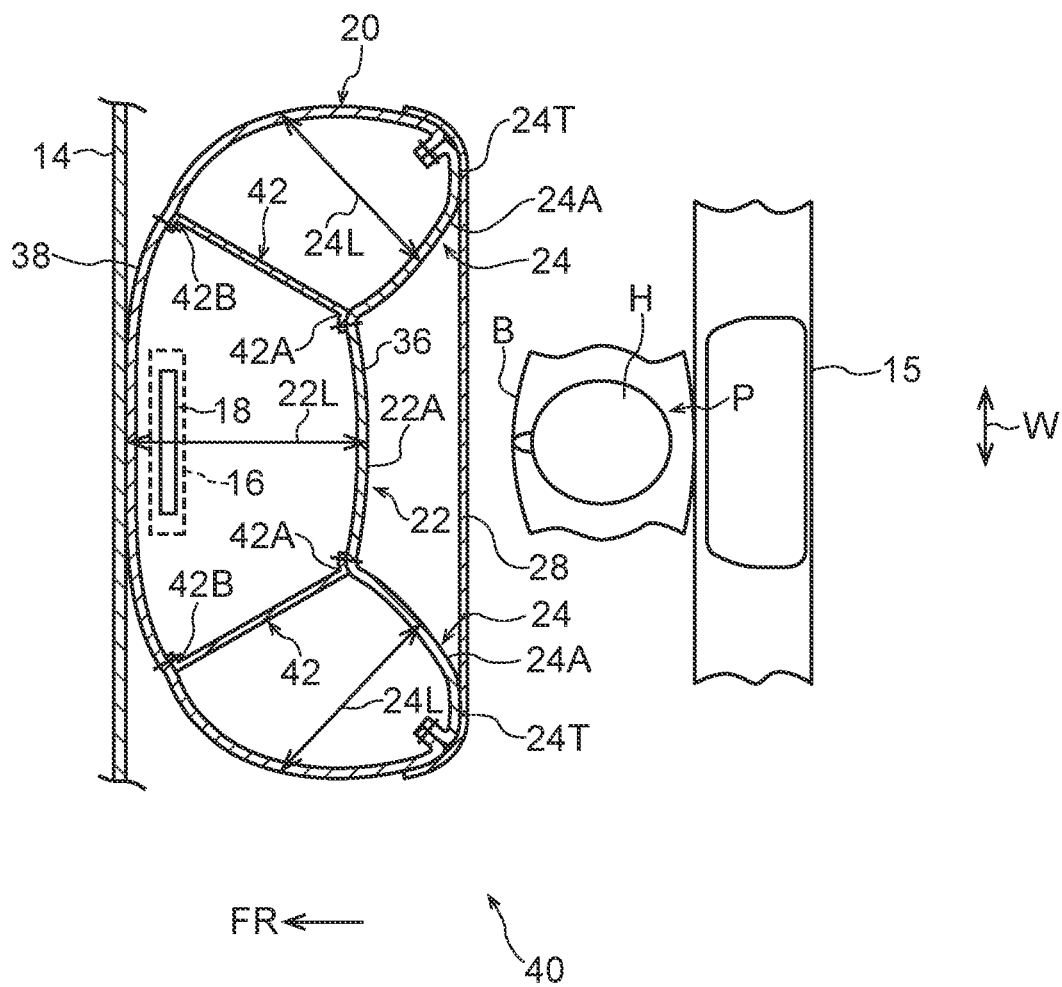

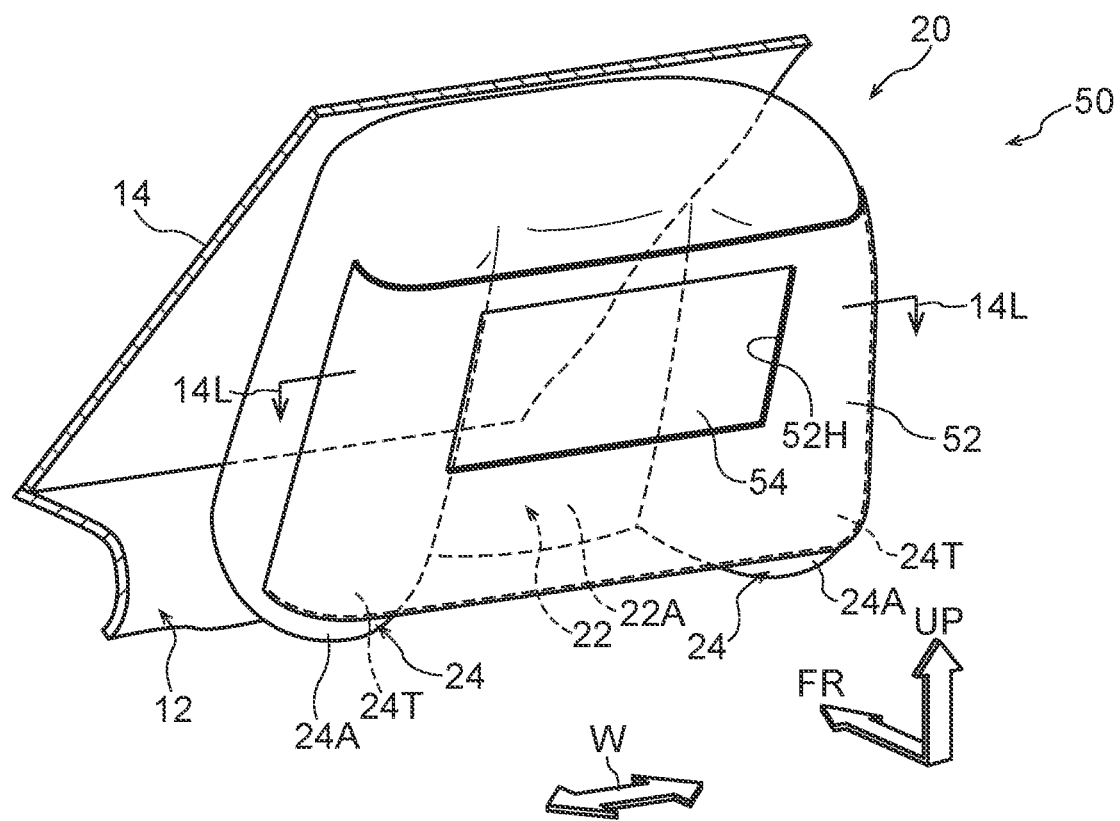

AIRBAG DEVICE FOR FRONT PASSENGER SEAT AND AIRBAG FOLDING METHOD

CROSS-REFERENCE TO RELATED APPLICATION

This application is based on and claims priority under 35 USC 119 from Japanese Patent Application No. 2017-080839 filed on Apr. 14, 2017, the disclosure of which is incorporated by reference herein.

BACKGROUND

Technical Field

The present disclosure relates to an airbag device for a front passenger seat and to a method of folding an airbag.

Related Art

Side airbag devices for a front passenger seat are known (refer to Japanese Patent Application Laid-Open (JP-A) No. 2009-6924, JP-A No. 2014-51152, JP-A No. 2003-335203, JP-A No. H05-92746, and JP-A No. 2016-16730). For example, JP-A No. 2009-6924 discloses a technique relating to an airbag device in which an airbag has two chambers at the left and the right, and these left and right two chambers are disposed adjacent to one another.

To describe this structure briefly, in this related art, the respective airbag surfaces that are at the passenger sides of these left and right two chambers are connected in the left-right direction by a connecting cloth. At the time of a front collision of the vehicle, the impact to the head portion and the chest portion of the passenger can be mitigated due to the head portion and the chest portion of the passenger being received at the connecting cloth.

However, in the case of the above-described related art, because the left and right two chambers are disposed adjacent to one another, the dimension of the connecting cloth in the left-right direction is small. At the time of an oblique collision, when the passenger abuts the connecting cloth while being offset in the left-right direction from the central portion of the connecting cloth, there is the possibility that only an effect of the same extent as if there were no connecting cloth can be obtained.

SUMMARY

In view of the above-described circumstances, the present disclosure provides an airbag device for a front passenger seat and a method of folding an airbag that, even at the time of an oblique collision, can receive the head portion and the chest portion of a passenger at a connecting cloth, and can mitigate the impact to the head portion and the chest portion of the passenger.

An airbag device for a front passenger seat of a first aspect of the present disclosure includes: an inflator that is operable to generate gas; and an airbag for a front passenger seat that is accommodated in a folded-up state, and that receives a supply of gas generated by the inflator and is inflated and deployed at a front side of a front passenger seat at a height position that corresponds to at least a region from a head portion to a chest portion of a passenger in the front passenger seat, wherein the airbag includes a first structural portion that structures a left-right direction intermediate portion of the airbag and at which is formed a first surface that faces the front passenger seat in an inflated and deployed state, and second structural portions that are formed in continuation with both left and right both sides of the first structural portion and at which are formed a pair of respective second surfaces that, in an inflated and deployed state, bulge further toward the front passenger seat side than the first surface and move apart from one another, and a connecting cloth, which connects regions that become bulging end portion sides of the pair of second surfaces in an inflated and deployed state of the airbag, and which, at a time of a front collision including an oblique collision, is deployed so as to cover a range that is reached by the head portion and the chest portion of the passenger in the front passenger seat, is provided.

In the above-described structure, due to the inflator operating in a case in which a front collision of the vehicle is sensed or predicted for example, the inflator generates gas. The airbag for a front passenger seat receives the supply of gas generated by the inflator, and is inflated and deployed at the front side of the front passenger seat and at a height position that corresponds to at least the region from the head portion to the chest portion of the passenger in the front passenger seat. Regions, which become bulging end portion sides of the pair of left and right second surfaces in the inflated and deployed state of the airbag, are connected by the connecting cloth. The connecting cloth is deployed so as to cover the range that is reached by the head portion and the chest portion of the passenger in the front passenger seat at the time of a front collision including an oblique collision. Therefore, at the time of a front collision, the head portion and the chest portion of the passenger in the front passenger seat are first received by the connecting cloth. At this time, the bulging end portions at the left and right second structural portions of the airbag are pulled toward the left-right direction central side, and therefore, the passenger shifting left and right can be suppressed. Further, when the head portion and the chest portion of the passenger reach the airbag via the connecting cloth, they are held by the reaction force that is due to the compression of the airbag.

Here, the first surface that faces the front passenger seat in the inflated and deployed state of the airbag is formed at the first structural portion that structures the left-right direction intermediate portion of the airbag. The pair of second surfaces at the second structural portions, which are formed in continuation with the left and right both sides of the first structural portion, are formed so as to, in the inflated and deployed state of the airbag, bulge further toward the front passenger seat side than the first surface and move apart from one another. Therefore, at the time of inflation and expansion of the airbag, the space that is formed between the connecting cloth and the airbag can be made to be long in the vehicle transverse direction. Due thereto, even if, for example, at the time of an oblique collision, the head portion and the chest portion of the passenger in the front passenger seat abut the connecting cloth while offset toward the left or the right from the left-right direction central portion of the connecting cloth, the head portion and the chest portion are received by the connecting cloth at the vehicle rear side of the space that is formed between the connecting cloth and the airbag.

In an airbag for a front passenger seat of a second aspect of the present disclosure, in the structure of the first aspect, at the airbag, as seen in a vehicle plan view, a thickness dimension of the second structural portions in an inflated and deployed state is set to be smaller than a thickness dimension of a left-right direction central portion of the first structural portion in an inflated and deployed state. Note that "thickness of the second structural portions" means the maximum thickness of portions that bend (are displaced) toward the left-right direction central side of the airbag together with the bulging end portions of the second surfaces of the second structural portions in a case in which the bulging end portions receive force toward the left-right direction central side of the airbag.

In accordance with the above-described structure, in a case in which the connecting cloth receives the head portion and the chest portion of the passenger in the front passenger seat at the time of a front collision, at the airbag, the left and right second structural portions start to bend before the left-right direction central portion of the first structural portion. Therefore, bending deformation in a vicinity of the left-right direction central portion of the airbag at the time of a front collision is suppressed.

In an airbag device for a front passenger seat of a third aspect of the present disclosure, in the structure of the first or second aspect, the airbag includes: a top surface panel that structures a top surface portion in an inflated and deployed state, and at which first regions, which are at both left and right end sides with respect to a left-right direction intermediate portion of the top surface panel as seen in a plan view, are bent toward a same side, and at which second regions, which are at the both left and right end sides, are disposed so as to bulge toward the front passenger seat side in an inflated and deployed state of the airbag; a bottom surface panel that structures a bottom surface portion in an inflated and deployed state, and at which third regions, which are at both left and right end sides with respect to a left-right direction intermediate portion of the bottom surface panel as seen in a bottom view, are bent toward a same side, and at which fourth regions, which are at the pair of left and right both end sides, are disposed so as to bulge toward the front passenger seat side in an inflated and deployed state of the airbag, and in which mounting holes for mounting the inflator or gas supply holes that are connected to the inflator are formed so as to pass-through; a front surface panel that structures a front surface portion that is disposed at the front passenger seat side in an inflated and deployed state, and that is formed in a rectangular shape; and a back surface panel that is disposed at a front windshield side in an inflated and deployed state, and that is formed in a rectangular shape having a larger left-right direction dimension is greater than that of the front surface panel, and wherein: an outer peripheral edge portion of the top surface panel and respective upper end edge portions of the front surface panel and the back surface panel are sewn together, and right end edge portions of the front surface panel and the back surface panel are sewn together, and left end edge portions of the front surface panel and the back surface panel are sewn together, and an outer peripheral edge portion of the bottom surface panel and respective lower end edge portions of the front surface panel and the back surface panel are sewn together.

In accordance with the above-described aspect, due to the top surface panel, the bottom surface panel, the front surface panel and the back surface panel being sewn as described above, the airbag, which is a shape having the first structural portion and the second structural portions, is formed easily.

In an airbag device for a front passenger seat of a fourth aspect of the present disclosure, in the structure of the third aspect, a deformation suppressing member, which suppresses deformation of a left-right direction intermediate portion of the front surface panel toward the front passenger seat side due to pressure of gas supplied into the airbag, is mounted at a reverse surface of the left-right direction intermediate portion of the front surface panel.

In accordance with the above-described structure, the deformation suppressing member is mounted to the reverse surface of the left-right direction intermediate portion of the front surface panel. The deformation suppressing member suppresses deformation, toward the front passenger seat side, of the left-right direction intermediate portion of the front surface panel due to the pressure of the gas supplied into the airbag.

In an airbag device for a front passenger seat of a fifth aspect of the present disclosure, in the structure of the third aspect, a pair of left and right cloth-like members, which connect an inner surface of the back surface panel with reverse surface sides of border portions between the first surface and the second surfaces at the front surface panel, are provided, and the pair of left and right cloth-like members are configured to extend toward sides of moving apart from one another while heading toward a vehicle front side while respectively moving apart from one another at an incline, in an inflated and deployed state of the airbag.

In accordance with the above-described structure, even though the shapes of the top surface panel and the bottom surface panel are made to be simple shapes that are such that, for example, the both end sides of oval shapes are bent, the shape at the time of inflation and expansion of the airbag is maintained stably by the pair of left and right cloth-like members.

In an airbag device for a front passenger seat of a sixth aspect of the present disclosure, in the structure of the third aspect, a pair of left and right cloth-like members, which connect an inner surface of the back surface panel with reverse surface sides of border portions between the first surface and the second surfaces at the front surface panel, are provided, and the pair of left and right cloth-like members extend along a vehicle longitudinal direction in an inflated and deployed state of the airbag.

In accordance with the above-described structure, at the time of inflation and expansion of the airbag, the left-right direction intermediate portion of the front surface panel and the left-right direction intermediate portion of the back surface panel become, due to the left and right pair of cloth-like members, shapes that are relatively flat and that run along the left-right direction. Therefore, at the time of inflation and expansion of the airbag, the range, at which the thickness of the first structural portion of the airbag is approximately uniform, is ensured to be long in the vehicle transverse direction, and the range, at which the interval between the connecting cloth and the first surface of the first structural portion of the airbag is approximately uniform, is ensured to be long in the vehicle transverse direction. Due thereto, the effect of mitigating impact in a case in which the passenger in the front passenger seat is received at the left-right direction central portion of the connecting cloth, and the effect of mitigating impact in a case in which the passenger in the front passenger seat is received at nearer to either of the left or right ends of the connecting cloth, are approximately the same.

In an airbag device for a front passenger seat of a seventh aspect of the present disclosure, in the structure of the third aspect, plural cloth-like members that connect the front surface panel with the back surface panel are provided at both left and right sides of an interior of the airbag, respectively; and the plural cloth-like members are configured such that, among regions at both left and right sides of the front surface panel in an inflated and deployed state of the airbag, regions that are disposed at a vehicle front side of the connecting cloth and apart from the connecting cloth configure stepped shapes that run along a pair of virtual straight lines that are inclined from a central portion of the first structural portion toward the front passenger seat side while moving apart from one another as seen in a vehicle plan view.

In accordance with the above-described structure, at the left and right both sides of the airbag interior, the front surface panel and the back surface panel are connected by the plural cloth-like members. Further, due to the plural cloth-like members, in the inflated and deployed state of the airbag, the regions that are disposed so as to be apart from the connecting cloth at the vehicle front side of the connecting cloth, among the regions at the left and right both sides of the front surface panel, become stepped shapes that run along a pair of virtual straight lines that are inclined from a central portion of the first structural portion toward the front passenger seat side while heading away from one another as seen in a vehicle plan view. Due thereto, in a case in which the passenger abuts the connecting cloth, and the bulging end portions of the left and right second structural portions of the airbag receive load from the connecting cloth, at the airbag, the respective closed cross-sectional portions, which are partitioned by the cloth-like members at the left and right second structural portions, start to be compressed toward the side of the central portion of the first structural portion, more than the bulging end portions of the left and right second structural portions start to bend toward the inner side. Therefore, even if the connecting cloth is pushed by the passenger, it is difficult for the left and right second structural portions of the airbag to bend toward the inner side.

In an airbag device for a front passenger seat of an eighth aspect of the present disclosure, in the structure of any one of the first through seventh aspects, a hole portion is configured to pass-through the connecting cloth at a region corresponding to the head portion of the passenger in the front passenger seat, and a closing cloth, which is formed of a material that stretches more easily than the connecting cloth, is attached to close-off the hole portion.

In accordance with the above-described structure, at the time of a front collision, the chest portion of the passenger in the front passenger seat is received by the connecting cloth, and the head portion of the passenger in the front passenger seat is received by the closing cloth that is formed of a material that stretches more easily than the connecting cloth. At this time, the head portion of the passenger is held while impact thereto is mitigated by the closing cloth that stretches more easily than the connecting cloth.

In an airbag device for a front passenger seat of a ninth aspect of the present disclosure, in the structure of any one of the first through seventh aspects, at the connecting cloth, an upper side region, which is disposed at a height position that the head portion of the passenger in the front passenger seat reaches at a time of a front collision, is structured by a cloth material that stretches more easily than a lower side region that is disposed at a height position that the chest portion of the passenger in the front passenger seat reaches at a time of a front collision.

In accordance with the above-described structure, at the time of a front collision, the chest portion of the passenger in the front passenger seat is held securely by the lower side region that is structured by a cloth material that is harder to stretch than the upper side region at the connecting cloth. Further, the head portion of the passenger in the front passenger seat is held, while impact thereto is mitigated, by the upper side region that is structured of a cloth material that stretches more easily than the lower side region at the connecting cloth.

In an airbag device for a front passenger seat of a tenth aspect of the present disclosure, in the structure of any one of the first through ninth aspects, the connecting cloth is structured by a cloth material that stretches more easily than a base cloth that structures the airbag.

In accordance with the above-described structure, at the time of a front collision, the head portion and the chest portion of the passenger in the front passenger seat are held, while impact thereto is mitigated, by the connecting cloth that stretches more easily than the base cloth that structures the airbag. Further, until the head portion of the passenger abuts the airbag via the connecting cloth, the load rises relatively gradually, and thereafter, the load increases due to the compression reaction force of the airbag.

A method of folding an airbag of an eleventh aspect of the present disclosure is a method of folding the airbag that is provided at the airbag device for a front passenger seat of any one of the first through tenth aspects, and includes: a first step of folding, plural times, left and right end portion sides of the airbag, which is in a state before folding, toward a left-right direction central side at fold lines that run along an airbag vertical direction, to fold the airbag inward with a side, which faces the front passenger seat side in an inflated and deployed state of the airbag, being an inner side; and a second step of folding the airbag, after the first step, in a form of a roll from an upper edge side toward a lower edge side such that a side, at which a pair of left and right folded portions appear to be lined-up, is an inner side.

In accordance with the above-described structure, in the first step, the left and right end portion sides of the airbag that is in a state before folding are folded plural times toward a left-right direction central side at fold lines that run along an airbag vertical direction, such that the airbag is folded-in with the side, which faces the front passenger seat side in the inflated and deployed state of the airbag, being the inner side. In the second step, the airbag, which has undergone the first step, is folded in the form of a roll from the upper edge side toward the lower edge such that the side, at which the pair of left and right folded portions appear to be lined-up, is the inner side. The airbag that is folded in this way expands toward the upper side along the front windshield in the first half of the inflation and expansion at the time of a front collision, and subsequently inflates and expands so as to open toward the left and the right along the front windshield, and, due thereto, the connecting cloth is pulled in the left-right direction. Therefore, even if the passenger abuts the connecting cloth before completion of the inflation and expansion of the airbag, there is no pulling at the connecting cloth, and thus, the load applied to the passenger can be kept low.

As described above, in accordance with the airbag device for a front passenger seat of the first aspect of the present disclosure, there is the excellent effect that, also at the time of an oblique collision, the head portion and the chest portion of the passenger are received by the connecting cloth, and the impact to the head portion and the chest portion of the passenger can be mitigated.

In accordance with the airbag device for a front passenger seat of the second aspect of the present disclosure, there is the excellent effect that, by suppressing bending deformation in a vicinity of the left-right direction central portion of the airbag at the time of a front collision, the connecting cloth that is pushed by the head portion and the chest portion reaching the airbag early can be suppressed.

In accordance with the airbag device for a front passenger seat of the third aspect of the present disclosure, there is the excellent effect that, by a simple structure, the airbag that has the first structural portion and the second structural portions can be manufactured easily.

In accordance with the airbag device for a front passenger seat of the fourth aspect of the present disclosure, there is the excellent effect that the shape at the time of inflation and expansion of the airbag can be maintained easily by the deformation suppressing member.

In accordance with the airbag device for a front passenger seat of the fifth aspect of the present disclosure, there is the excellent effect that, because there is no need to complicate the shapes of the top surface panel and the bottom surface panel, the ease of manufacturing the airbag can be ensured.

In accordance with the airbag device for a front passenger seat of the sixth aspect of the present disclosure, there is the excellent effect that, at the time of a front collision of the vehicle, dispersion in the impact mitigating effects depending on the left-right direction position at which the passenger in the front passenger seat abuts the connecting cloth can be suppressed even more.

In accordance with the airbag device for a front passenger seat of the seventh aspect of the present disclosure, there is the excellent effect that, in a case in which the head portion and the chest portion of the passenger in the front passenger seat abut the connecting cloth at the time of a front collision of the vehicle, the connecting cloth reaching the first structural portion of the airbag early can be suppressed due to the suppression of bending of the left and right second structural portions of the airbag toward the inner side.

In accordance with the airbag device for a front passenger seat of the eighth aspect of the present disclosure, there is the excellent effect that, at the time of a front collision of the vehicle, the head portion of the passenger can be held at a low load by the closing cloth while the chest portion of the passenger is held securely by the connecting cloth.

In accordance with the airbag device for a front passenger seat of the ninth aspect of the present disclosure, there is the excellent effect that, at the time of a front collision of the vehicle, the head portion of the passenger can be held at a low load by the upper side region of the connecting cloth while the chest portion of the passenger is held securely by the lower side region of the connecting cloth.

In accordance with the airbag device for a front passenger seat of the tenth aspect of the present disclosure, there is the excellent effect that, at the time of a front collision of the vehicle, the initial load that is inputted to the head portion of the passenger can be suppressed.

In accordance with the method of folding an airbag of the eleventh aspect of the present disclosure, there is the excellent effect that load applied to the passenger can be suppressed in a case in which the passenger abuts the connecting cloth before completion of inflation and expansion of the airbag that is provided at the airbag device for a front passenger seat of any one of the first through tenth aspects.

BRIEF DESCRIPTION OF THE DRAWINGS

Exemplary embodiments of the present disclosure will be described in detail based on the following figures, wherein:

FIG. 4A is an exploded view showing a state in which the airbag and a connecting cloth of FIG. 2 are exploded and deployed;

FIG. 4B is a perspective view showing a front surface panel of FIG. 4A;

FIG. 5A is a schematic drawing for explaining a method of folding the airbag of FIG. 2, and is a perspective view in which fold lines along which the airbag is folded in a first step are shown by two-dot chain lines;

FIG. 5B is a schematic drawing for explaining the method of folding the airbag of FIG. 2, and is a perspective view showing a state after completion of the first step;

FIG. 5C is a schematic drawing for explaining the method of folding the airbag of FIG. 2, and is a perspective view showing a state in which the airbag is folded in the form of a roll in a second step;

FIG. 5D is a schematic drawing for explaining the method of folding the airbag of FIG. 2, and is cross-sectional view showing, in an enlarged manner, the state cut along line 5D-5D of FIG. 5A;

FIG. 8 is a horizontal sectional view that corresponds to FIG. 3 and that shows, by two-dot chain lines, a state in the midst of inflation and expansion of the airbag in the first embodiment, and shows, by solid lines, the state when inflation and expansion are completed;

FIG. 9 is a perspective view showing a state in which the airbag of an airbag device for a front passenger seat relating to a second embodiment of the present disclosure has inflated and deployed;

FIG. 10 is a cross-sectional view showing the state cut along line 10L-10L of FIG. 9;

FIG. 13 is a perspective view showing a state in which the airbag of an airbag device for a front passenger seat relating to a third embodiment of the present disclosure has inflated and deployed;

DETAILED DESCRIPTION

First Embodiment

An airbag device for a front passenger seat and a method of folding an airbag relating to a first embodiment of the present disclosure are described hereinafter on the basis of FIG. 1 through FIG. 8. Note that arrow FR that is shown appropriately in these drawings indicates the vehicle forward side, arrow UP indicates the vehicle upward side, and arrow W indicates the vehicle transverse direction. Hereinafter, when description is given by using merely longitudinal, left-right and vertical directions, they refer to the longitudinal of the vehicle longitudinal direction, the left and right of the vehicle left-right direction (the vehicle transverse direction) and the vertical of the vehicle vertical direction, unless otherwise indicated.

Figure 1:
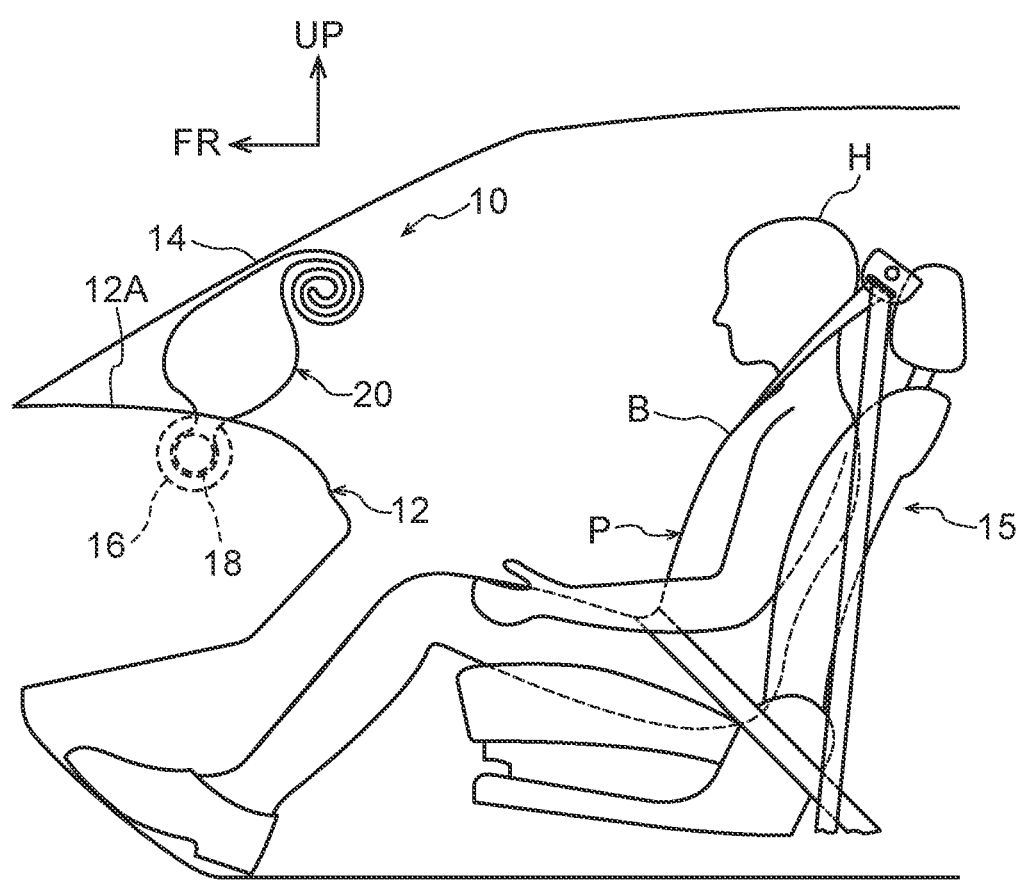
FIG. 1 is side view showing a state in the first half of inflation and expansion of an airbag of an airbag device for a front passenger seat relating to a first embodiment of the present disclosure.

As shown in FIG. 1, an airbag device 10 for a front passenger seat relating to the present embodiment is disposed at a front passenger seat 15 side of a top wall portion 12A of an instrument panel 12, and has an airbag case 16, an inflator 18 and an airbag 20. Note that a front windshield 14 is provided at the upper side of the instrument panel 12.

The airbag case 16 is made of a metal material or the like, and is disposed at the reverse surface side of the instrument panel 12 such that the vehicle upper side of the airbag case 16 is the opening side. The airbag case 16 is supported via brackets at a strength member such as an unillustrated instrument panel reinforcement or the like. At times of usual usage, the upper end opening portion of the airbag case 16 is closed by an unillustrated airbag door that is mounted to the instrument panel 12. Due to bag inflation pressure of a predetermined value or more being applied to the airbag door, the airbag door expands and opens the upper end opening portion of the airbag case 16. Note that FIG. 1 illustrates a state in which the upper end opening portion of the airbag case 16 is open (a state in the first half of the inflation and expansion of the airbag 20).

The inflator 18 is, for example, a cylinder-type gas generating device that, at the time of a front collision of the vehicle or at the time when a front collision is predicted, jets-out gas and can supply the gas into the airbag 20. The inflator 18 is connected to an airbag ECU via a wire harness (neither of which is illustrated), and generates gas by operating due to operation current from the airbag ECU. The airbag ECU causes operation current to flow to the inflator 18 at the time when the airbag ECU judges that there is a front collision of the vehicle or at the time when the airbag ECU predicts a front collision in accordance with a signal from a collision sensor (not illustrated).

The airbag 20 is formed in the shape of a bag due to plural panels, which are formed by, for example, nylon or polyester base cloths being cut-out, being sewn-together. At usual times, the airbag 20 is accommodated within the airbag case 16 in a state of being folded-up. The above-described inflator 18 is accommodated within the airbag 20. Unillustrated stud bolts stand erect at the peripheral wall portion of the inflator 18, and these stud bolts are passed-through the airbag 20 and are passed-through the airbag case 16. The airbag 20 is, together with the inflator 18, fixed to the airbag case 16 due to unillustrated nuts being screwed-together with the passed-through end portions of the stud bolts from the exterior of the airbag case 16. Note that a diffuser, which is formed in the shape of a cylindrical tube that is one size larger than the inflator 18, may be disposed at the periphery of the inflator 18. To describe a concrete example, the aforementioned stud bolts may stand erect from the diffuser rather than from the inflator 18, and the inflator 18 and the diffuser may be made integral by the inflator 18 being inserted into the diffuser, and thereafter, the diffuser being caulked toward the radial direction inner side.

Figure 2:
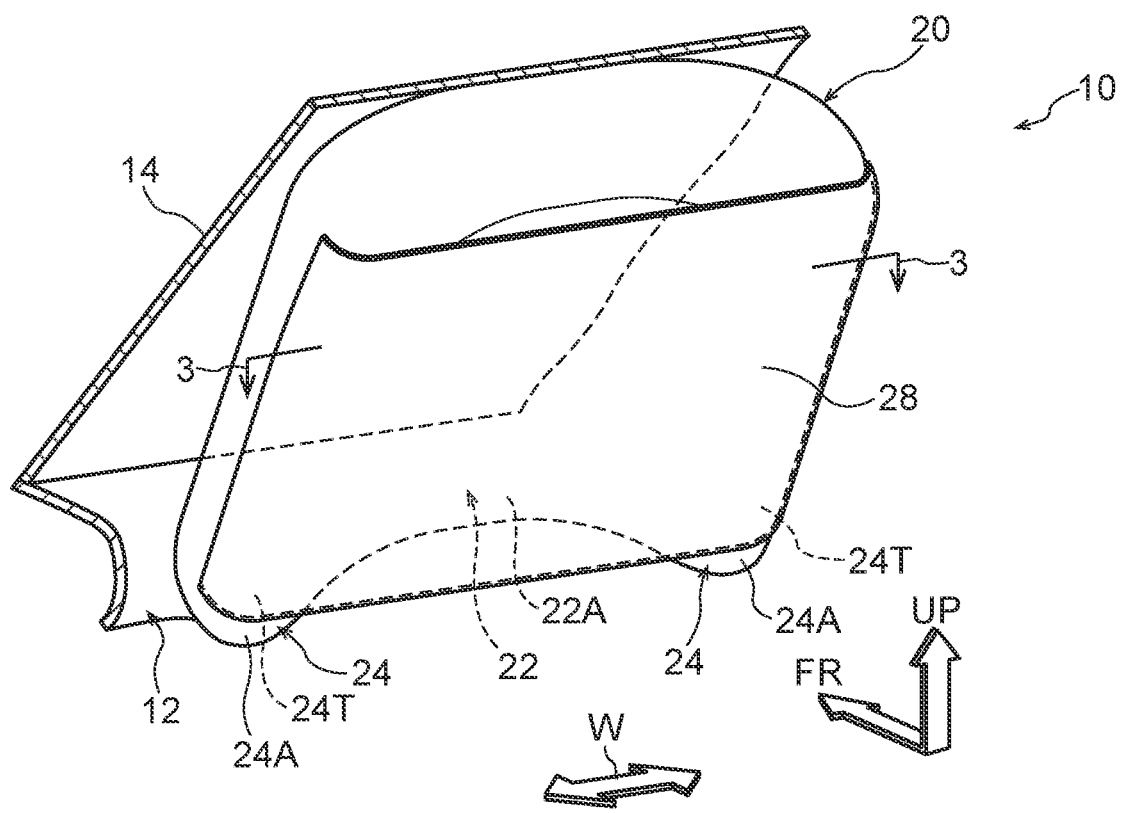
FIG. 2 is a perspective view showing a state in which the airbag of the airbag device for a front passenger seat relating to a first embodiment has inflated and deployed.
Figure 3:
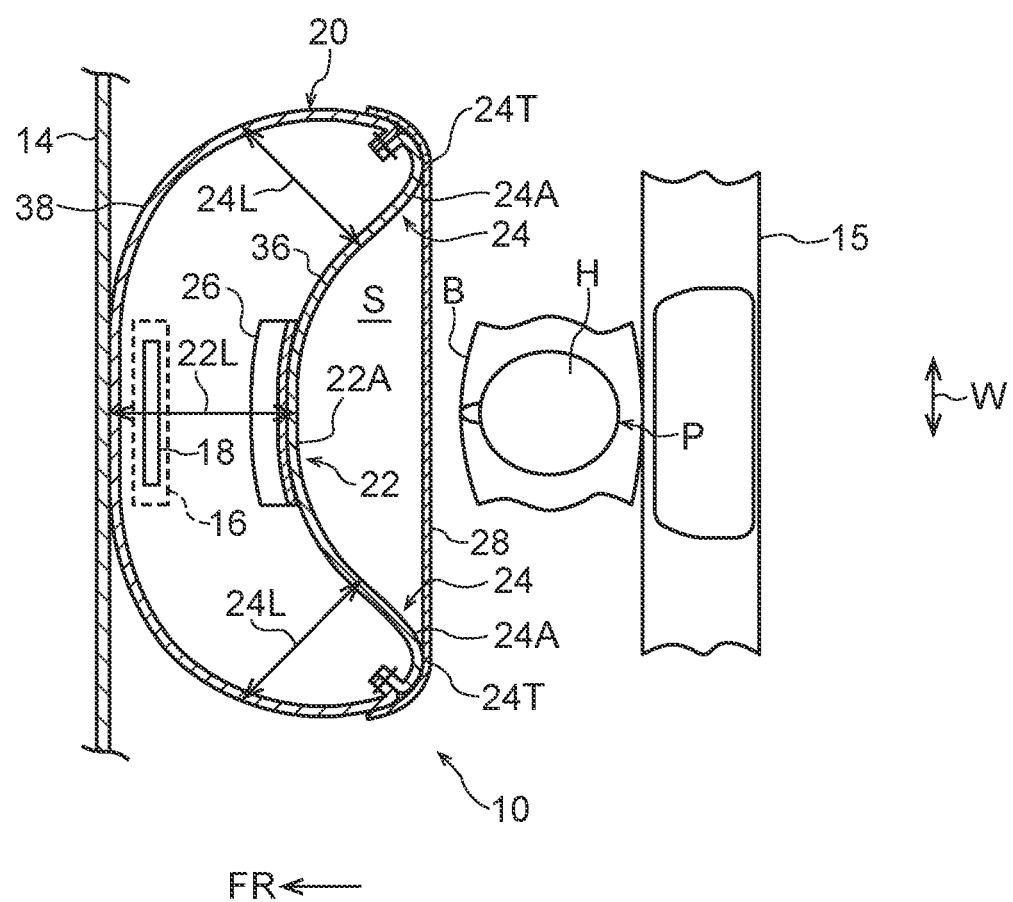
FIG. 3 is a cross-sectional view showing the state cut along line 3-3 of FIG. 2.

On the other hand, the airbag 20 is structured so as to receive the supply of gas generated by the inflator 18, and inflate and expand (refer to FIG. 2 and FIG. 3) at the front side of the front passenger seat 15 at a height position that corresponds to at least the region from a head portion H to a chest portion B of a passenger P of the front passenger seat 15 (hereinafter abbreviated "passenger P" as appropriate). The left-right direction dimension of the airbag 20 in the inflated and deployed state is set to be larger than the lateral width dimension of the passenger P. Note that the passenger P is an AM50 (a 50th percentile U.S. adult male) dummy. As shown in FIG. 2 and FIG. 3, the airbag 20 has a first structural portion 22 that structures the left-right direction intermediate portion of the airbag 20 and at which is formed a first surface 22A that faces the front passenger seat 15 in the inflated and deployed state (refer to FIG. 3, only a portion of the upper portion of the front passenger seat 15 is illustrated in FIG. 3). Further, the airbag 20 has second structural portions 24 that are formed in continuation with the left and right both sides of the first structural portion 22, and at which are formed a pair of second surfaces 24A that bulge further toward the front passenger seat 15 side than the first surface 22A and move apart from one another in the inflated and deployed state. In other words, as seen from the passenger P of the front passenger seat 15, the airbag 20 is configured to inflate and deployed in a shape in which the left-right direction intermediate portion thereof is concave.

The first structural portion 22 is formed so as to extend in the vertical direction, and is set such that the upper portion side thereof faces the head portion H of the passenger P and the lower portion side thereof faces the chest portion B of the passenger P. The dimension of the first structural portion 22 along the vehicle transverse direction is set to be slightly larger than the lateral width dimension of the chest portion B of the passenger P for example. As shown in FIG. 3, the airbag 20 is set such that, as seen in a vehicle plan view, thickness dimension 24L of the second structural portions 24 in the inflated and deployed state is smaller than thickness dimension 22L of the left-right direction central portion of the first structural portion 22 in the inflated and deployed state. Note that the thickness dimension 24L of the second structural portion 24 means the maximum thickness dimension of a portion that bends (is displaced) toward the left-right direction central side of the airbag 20 together with a bulging end portion 24T of the second surface 24A of the second structural portion 24 in a case in which the bulging end portion 24T receives force toward the left-right direction central side of the airbag 20.

Further, as shown in FIG. 4A, the airbag 20 is structured to have a top surface panel 32, a bottom surface panel 34, a front surface panel 36, and a back surface panel 38. The top surface panel 32 structures the top surface portion of the airbag 20 in the inflated and deployed state. As seen in a plan view, at the top surface panel 32, a pair of left and right regions 32S at the both end sides are bent toward the same side (the lower side in the drawing) with respect to a left-right direction intermediate portion 32M. In the present embodiment, the top surface panel 32 is formed in a substantial crescent shape in which the both end sides of an oval are curved as seen in plan view. The top surface panel 32 is disposed such that, in the inflated and deployed state of the airbag 20, the pair of left and right regions 32S at the both end sides bulge toward the front passenger seat 15 (see FIG. 3) side. The bottom surface panel 34 structures the bottom surface portion in the inflated and deployed state of the airbag 20. At the bottom surface panel 34, a pair of left and right regions 34S at the both end sides are bent toward the same side (the upper side in the drawing) with respect to a left-right direction intermediate portion 34M as seen in a bottom view. In the present embodiment, the bottom surface panel 34 is formed in a substantial crescent shape in which the both end sides of an oval are curved as seen in a bottom view. The bottom surface panel 34 is disposed such that, in the inflated and deployed state of the airbag 20, the pair of left and right regions 34S at the both end sides bulge toward the front passenger seat 15 (see FIG. 3) side.

Mounting holes 34H for mounting the inflator 18 (see FIG. 3) are formed so as to pass-through the left-right direction central portion of the bottom surface panel 34. The stud bolts (not illustrated) that stand erect at the inflator 18 are passed-through these mounting holes 34H. Note that, as a modified example of the present embodiment, gas supplying holes (holes through which gas from the inflator 18 is supplied) that are connected to the inflator 18 may be formed so as to pass-through the left-right direction central portion of the bottom surface panel 34. The front surface panel 36 structures the front surface portion that is disposed at the front passenger seat 15 (see FIG. 3) side in the inflated and deployed state, and is formed in a rectangular shape. The back surface panel 38 is disposed at the front windshield 14 (see FIG. 2) side in the inflated and deployed state, and is formed in the shape of a rectangle whose left-right direction dimension is larger than that of the front surface panel 36. As an example, vent holes 38H are formed so as to pass-through the left and right both sides of the upper end portion side of the back surface panel 38.

At the airbag 20, the outer peripheral edge portion of the top surface panel 32 (refer to the region surrounded by two-dot chain lines 32A, 32B), and the respective upper end edge portions of the front surface panel 36 and the back surface panel 38 (refer to the region surrounded by two-dot chain line 36A and the region surrounded by two-dot chain line 38A) are sewn together. Further, at the airbag 20, the right end edge portions (refer to the region surrounded by two-dot chain line 36B and the region surrounded by two-dot chain line 38B) and the left end edge portions (refer to the region surrounded by two-dot chain line 36C and the region surrounded by two-dot chain line 38C) of the front surface panel 36 and the back surface panel 38 are sewn together. Moreover, the outer peripheral edge portion of the bottom surface panel 34 (refer to the region surrounded by two-dot chain lines 34A, 34B), and the respective lower end edge portions of the front surface panel 36 and the back surface panel 38 (refer to the region surrounded by two-dot chain line 36D and the region surrounded by two-dot chain line 38D) are sewn together.

Further, as shown in FIG. 4B, a deformation suppressing member 26, which is made of a fabric and is disposed in the shape of a wavy plate, is mounted to the reverse surface of the left-right direction intermediate portion of the front surface panel 36. The ridgeline portions of the deformation suppressing member 26 are disposed so as to extend along the left-right direction of the front surface panel 36. The deformation suppressing member 26 is a member for suppressing deformation of the left-right direction intermediate portion of the front surface panel 36 shown in FIG. 4A and FIG. 4B toward the front passenger seat 15 (see FIG. 3) side due to the pressure of the gas that is supplied into the airbag 20 shown in FIG. 2. Note that, as a modified example of the present embodiment, instead of the deformation suppressing member 26, another deformation suppressing member that functions substantially similarly to the deformation suppressing member 26 (e.g., a deformation suppressing member that is made of a fabric and at which ribs are provided at a flat-plate-shaped portion) may be mounted to the reverse surface of the left-right direction intermediate portion of the front surface panel 36.

Further, as shown in FIG. 2 and FIG. 3, a connecting cloth 28, which connects the regions that become the bulging end portion 24T sides of the pair of second surfaces 24A in the inflated and deployed state of the airbag 20, is provided at the airbag device 10 for a front passenger seat. The connecting cloth 28 expands so as to cover the range that is reached by the head portion H and the chest portion B of the passenger P of the front passenger seat 15 shown in FIG. 1, at the time of a front collision including at the time of an oblique collision. Note that, in the present embodiment, the connecting cloth 28 that is shown in FIG. 2 is configured to also cover the range that the head portion H and the chest portion B of the passenger P shown in FIG. 1 reach at the time of a front collision when the passenger P is not wearing a seatbelt. As an example, the connecting cloth 28 shown in FIG. 2 and FIG. 3 is structured of a cloth material that stretches more easily than the base cloth that structures the airbag 20.

The method of folding the airbag 20 that is provided at the airbag device 10 for a front passenger seat is described next with reference to FIGS. 5A through 5D.

First, in a first step, the left and right end portion sides of the airbag 20, which is in the state before folding that is shown in FIG. 5A, are folded-up plural times (refer to arrows a and b) toward the left-right direction central side at fold lines L1, L2 that run along the airbag vertical direction, such that the airbag 20 is folded-in with the side, which faces the front passenger seat 15 (see FIG. 3) side in the inflated and deployed state of the airbag 20, being the inner side, and the airbag 20 is set in the state shown in FIG. 5B. Note that one-dot chain line CL in FIG. 5A is the center line that shows the left-right direction center. In a second step, the airbag 20, which is shown in FIG. 5B and has undergone the first step, is folded in the form of a roll from the upper edge side toward the lower edge side as shown in FIG. 5C such that the side, at which a left and right pair of folded portions 20A, 20B appear to be lined-up, is the inner side. Due to the above, the airbag 20 that is in the folded-up state is obtained.

Note that FIG. 5D is an enlarged sectional view that shows, in an enlarged manner, the state cut along line 5D-5D of FIG. 5A. In FIG. 5D, the overlapping portions are illustrated as being apart from one another slightly, in order to make the drawing easy to understand. As shown in this drawing, in the present embodiment, the airbag 20 before the first step is in a state in which the left-right direction end portions of the back surface panel 38 are folded-over in advance onto the obverse sides of the left-right direction end portions of the front surface panel 36, and, in this state, the left-right direction end portions of the connecting cloth 28 are sewn to the back surface panel 38.

(Operation/Effects)

Figure 6A:
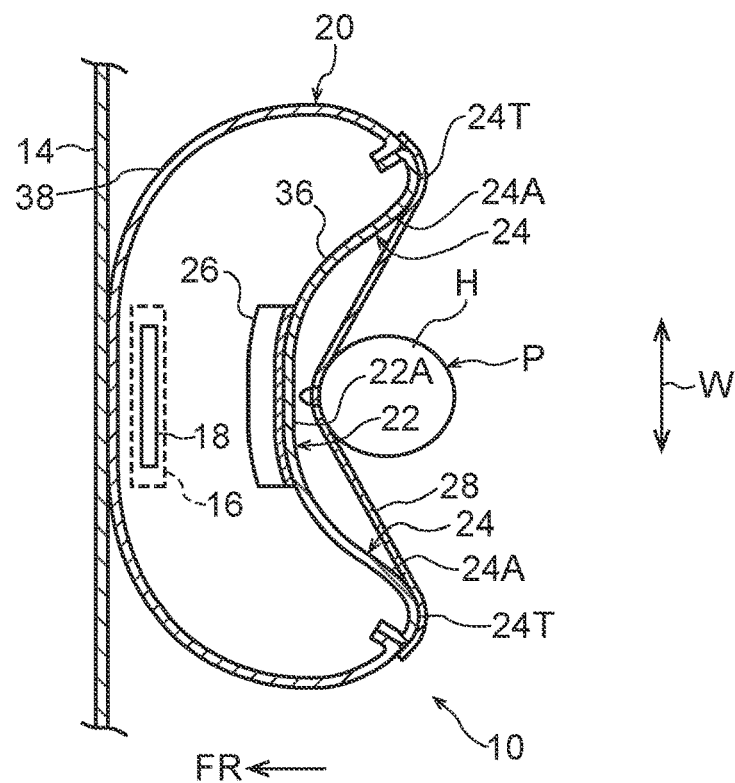
FIG. 6A is a horizontal sectional view showing, at the same cut position as in FIG. 3, a state that is after a passenger abuts the connecting cloth but is before the passenger reaches the airbag at the time of a front collision, in the first embodiment.

Operation and effects of the above-described embodiment are described next. In the airbag device 10 for a front passenger seat of the present embodiment that is shown in FIG. 1, in a case in which a front collision of the vehicle is sensed or predicted, the inflator 18 operates and generates gas. Further, the airbag 20 for the front passenger seat 15 receives a supply of the gas generated by the inflator 18, and, as shown in FIG. 2 and FIG. 3, inflates and expands at the front side of the front passenger seat 15 at a height position that corresponds to at least the region from the head portion H to the chest portion B of the passenger P of the front passenger seat 15. Further, the regions, which become the bulging end portion 24T sides of the pair of left and right second surfaces 24A in the inflated and deployed state of the airbag 20, are connected by the connecting cloth 28. At the time of a front collision including at the time of an oblique collision, the connecting cloth 28 is deployed so as to cover the range that is reached by the head portion H and the chest portion B of the passenger P of the front passenger seat 15. Therefore, as shown in FIG. 6A, at the time of a front collision, the head portion H and the chest portion B of the passenger P (refer to FIG. 3, and, hereinafter, mention of drawings referencing the chest portion B will be omitted as appropriate) are first received by the connecting cloth 28. At this time, because the left and right bulging end portions 24T of the airbag 20 are pulled toward the left-right direction central side, the passenger P shifting left and right can be suppressed.

Figure 6B:
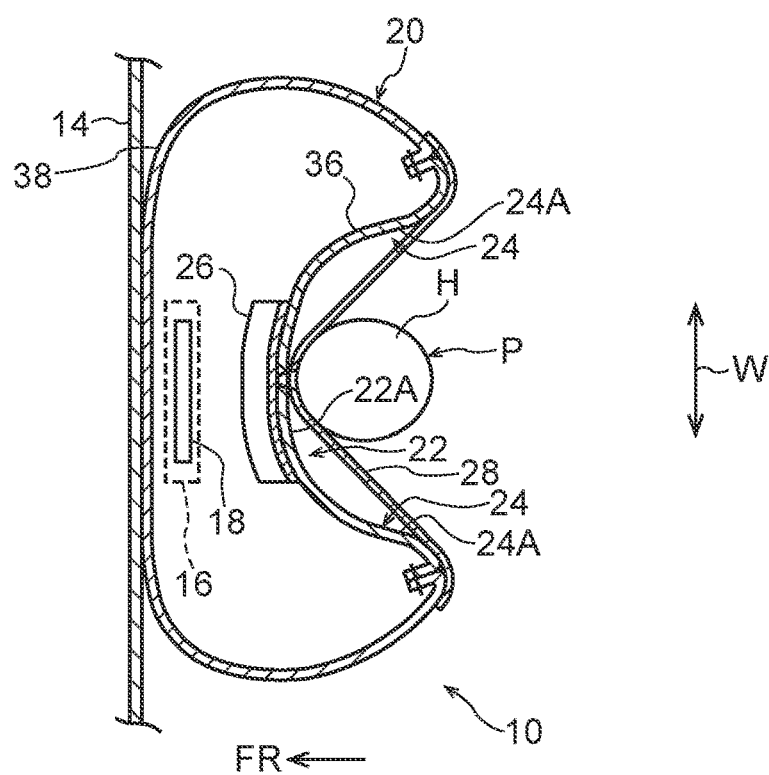
FIG. 6B is a horizontal sectional view showing, at the same cut position as in FIG. 3, a state that is after the passenger reaches the airbag at the time of a front collision, in the first embodiment.

Until immediately before the head portion H and the chest portion B of the passenger P reach the airbag 20 via the connecting cloth 28, the passenger P is held by the reaction forces of the left and right bulging end portions 24T of the airbag 20. On the other hand, as shown in FIG. 6B, when the head portion H and the chest portion B (see FIG. 3) of the passenger P reach the airbag 20 via the connecting cloth 28, the head portion H and the chest portion B are held by the reaction force that is due to the compression of the airbag 20. Namely, in the present embodiment, at the time of a front collision, the passenger P is held with the magnitude of the holding force being different at the earlier stage and at the latter stage.

Here, the first surface 22A, which faces the front passenger seat 15 in the inflated and deployed state of the airbag 20, is formed at the first structural portion 22 that structures the left-right direction intermediate portion of the airbag 20 shown in FIG. 3. The pair of second surfaces 24A at the second structural portions 24, which are formed in continuation with the left and right both sides of the first structural portion 22, are formed so as to, in the inflated and deployed state of the airbag 20, bulge further toward the front passenger seat 15 side than the first surface 22A and move apart from one another. Therefore, a space S that is formed between the connecting cloth 28 and the airbag 20 at the time of inflation and expansion of the airbag 20 can be made to be long in the vehicle transverse direction.

Figure 7A:
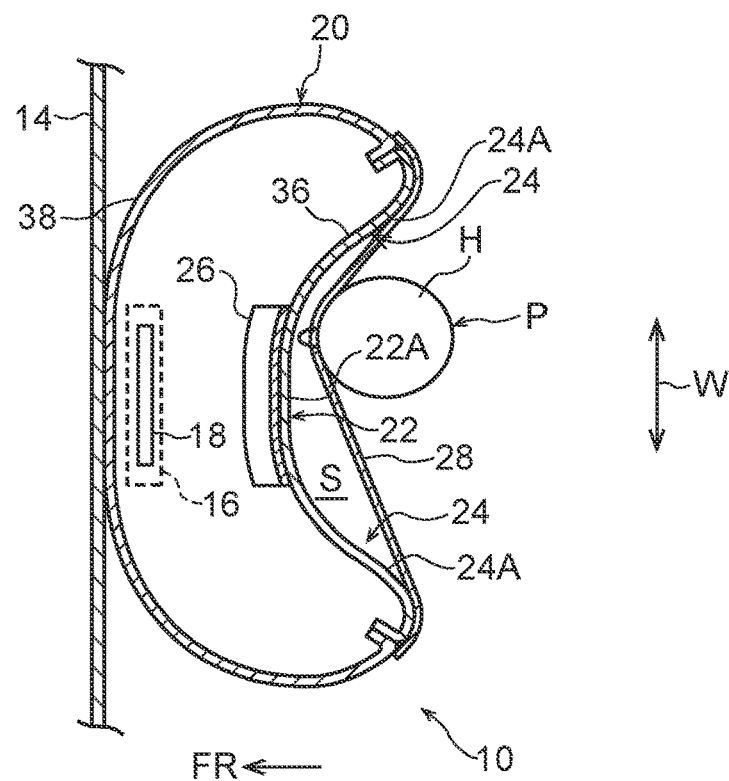
FIG. 7A is a horizontal sectional view showing, at the same cut position as in FIG. 3, a state in which the passenger abuts the connecting cloth at a position offset toward the right side at the time of a front collision, in the first embodiment.
Figure 7B:
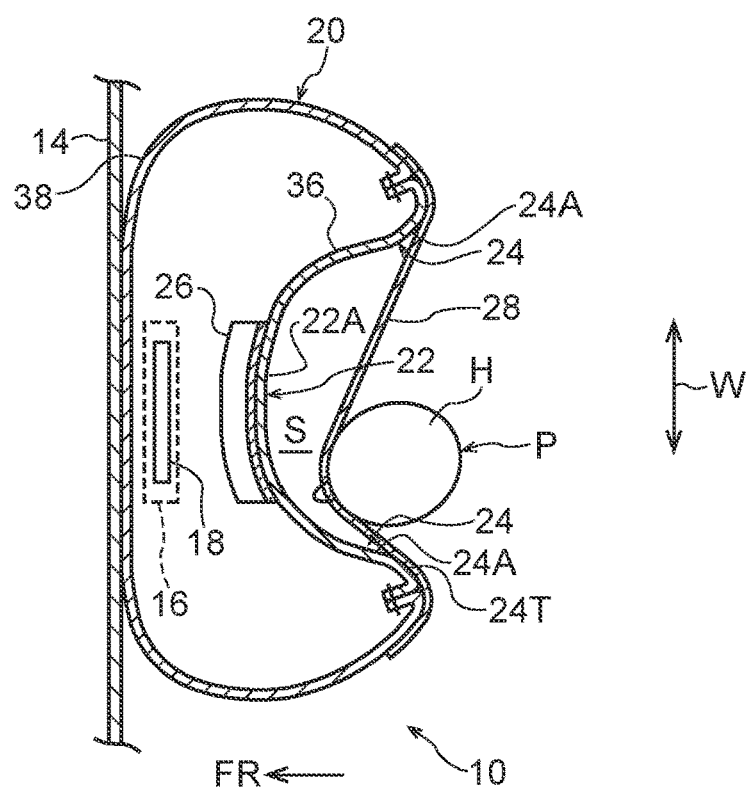
FIG. 7B is a horizontal sectional view showing, at the same cut position as in FIG. 3, a state in which the passenger moves in a left oblique direction and abuts the connecting cloth at the time of a front collision (the time of an oblique collision), in the first embodiment.

Due thereto, as shown in FIG. 7A, even in a case in which the automobile is involved in a front collision in a state which the passenger P is seated so as to be offset in the left-right direction, the head portion H and the chest portion B (see FIG. 3) of the passenger P are received by the connecting cloth 28 at the vehicle rear side of the space S that is formed between the connecting cloth 28 and the airbag 20. Namely, the head portion H and the chest portion B of the passenger P are held in approximately the same way as in a case in which the head portion H and the chest portion B abut the left-right direction central portion of the connecting cloth 28. Further, as shown in FIG. 7B, even if, at the time of an oblique collision, the passenger P inertially moves obliquely with respect to the vehicle longitudinal direction, and the head portion H and the chest portion B (see FIG. 3) of the passenger P abut the connecting cloth 28 so as to be offset toward the left or right from the left-right direction central portion of the connecting cloth 28, the head portion H and the chest portion B are received by the connecting cloth 28 at the vehicle rear side of the space S that is formed between the connecting cloth 28 and the airbag 20. Further, the bulging end portion 24T that is at the side toward which the passenger P has moved inertially (the left side of the vehicle in the drawing) is pulled toward the left-right direction central side, and therefore, it is difficult for the passenger P to come away from the airbag 20, and the passenger P is held stably.

In this way, in accordance with the airbag device 10 for a front passenger seat of the present embodiment, also at the time of an oblique collision, the head portion H and the chest portion B of the passenger P can be received by the connecting cloth 28, and the impact to the head portion H and the chest portion B of the passenger P can be mitigated.

Further, in the present embodiment, as shown in FIG. 3, as seen in a vehicle plan view, at the airbag 20, the thickness dimension 24L of the second structural portions 24 in the inflated and deployed state is set to be smaller than the thickness dimension 22L of the left-right direction central portion of the first structural portion 22 in the inflated and deployed state. Due thereto, as shown in FIG. 6 and the like, in a case in which the connecting cloth 28 receives the head portion H and the chest portion B (see FIG. 3) of the passenger P of the front passenger seat 15 at the time of a front collision, at the airbag 20, the left and right second structural portions 24 start to bend before the left-right direction central portion of the first structural portion 22. Therefore, bending deformation in a vicinity of the left-right direction central portion of the airbag 20 at the time of a front collision is suppressed. Accordingly, the connecting cloth 28, which is pushed by the head portion H and the chest portion B, reaching the first structural portion 22 of the airbag 20 early can be suppressed.

Further, in the present embodiment, the deformation suppressing member 26 is attached to the reverse surface of the left-right direction intermediate portion of the front surface panel 36. The deformation suppressing member 26 suppresses deformation, toward the front passenger seat 15 side, of the left-right direction intermediate portion of the front surface panel 36 due to the pressure of the gas that is supplied into the airbag 20. Accordingly, the shape at the time of inflation and expansion of the airbag 20 can be maintained easily by the deformation suppressing member 26.

In the present embodiment, as shown in FIGS. 4A and 4B, the airbag 20, which is a shape having the first structural portion 22 and the second structural portions 24 shown in FIG. 2, is formed due to the top surface panel 32, the bottom surface panel 34, the front surface panel 36 and the back surface panel 38 being sewn together as described above. Accordingly, the airbag 20 that has the first structural portion 22 and the second structural portions 24 can be manufactured easily by a simple structure.

Further, in the present embodiment, the airbag 20 is folded-up by undergoing the first step and the second step that are shown in above-described FIGS. 5A through 5D. The airbag 20 that is folded-up in this way expands toward the upper side along the front windshield 14 as shown in FIG. 1 in the first half of the inflation and expansion at the time of the front collision, and subsequently inflates and expands so as to open to the left and the right along the front windshield 14 as shown in FIG. 2, and, due thereto, the connecting cloth 28 is pulled in the left-right direction and is set in a state in which the expansion thereof is completed. Therefore, even if the passenger P (e.g., a passenger who is seated further toward the front side than the regular seated position) abuts the connecting cloth 28 before the completion of the inflation and expansion of the airbag 20 as is the case of the airbag 20 that is shown by the two-dot chain line in FIG. 8, there is no pulling at the connecting cloth 28, and therefore, the load applied to the passenger P can be suppressed.

Second Embodiment

An airbag device 40 for a front passenger seat relating to a second embodiment of the present disclosure is described next by using FIG. 9 through FIG. 12B. As shown in these drawings, the present embodiment differs from the first embodiment with regard to the point that a pair of left and right cloth-like members 42 for restricting deformation are provided instead of the deformation suppressing member 26 of the first embodiment (refer to FIGS. 4A and 4B and the like). The other structures are structures that are substantially similar to those of the first embodiment. Accordingly, structural portions that are substantially similar to those of the first embodiment are denoted by the same reference numerals, and description thereof is omitted. Further, a method that is similar to that of the first embodiment is used as the method of folding the airbag 20.

As shown in FIG. 9 and FIG. 10, the pair of left and right cloth-like members 42 connect the reverse surface sides of the border portions between the first surface 22A and the second surfaces 24A at the front surface panel 36, and the inner surface of the back surface panel 38, and are configured to extend obliquely toward sides of moving away from one another while heading toward the vehicle front side, in the inflated and deployed state of the airbag 20. As shown in FIG. 10, at the cloth-like members 42, end portions 42A at the vehicle rear side are fixed by sewing to the front surface panel 36, and end portions 42B at the vehicle front side are fixed by sewing to the back surface panel 38. As shown in FIG. 9, the cloth-like members 42 are disposed in a range in the vertical direction except for the upper end side and the lower end side of the airbag 20 interior. The cloth-like members 42 are fabricated by using the same material as the airbag 20 as an example.

Figure 11A:
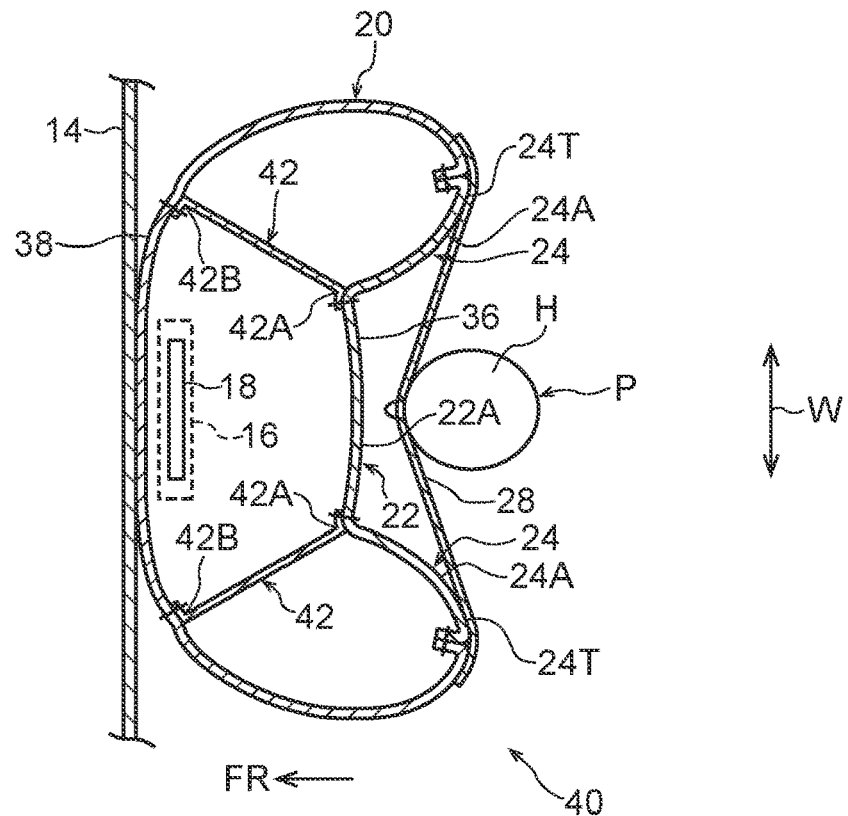
FIG. 11A is a horizontal sectional view showing, at the same cut position as in FIG. 10, a state that is after the passenger abuts the connecting cloth but is before the passenger reaches the airbag at the time of a front collision, in the second embodiment.
Figure 11B:
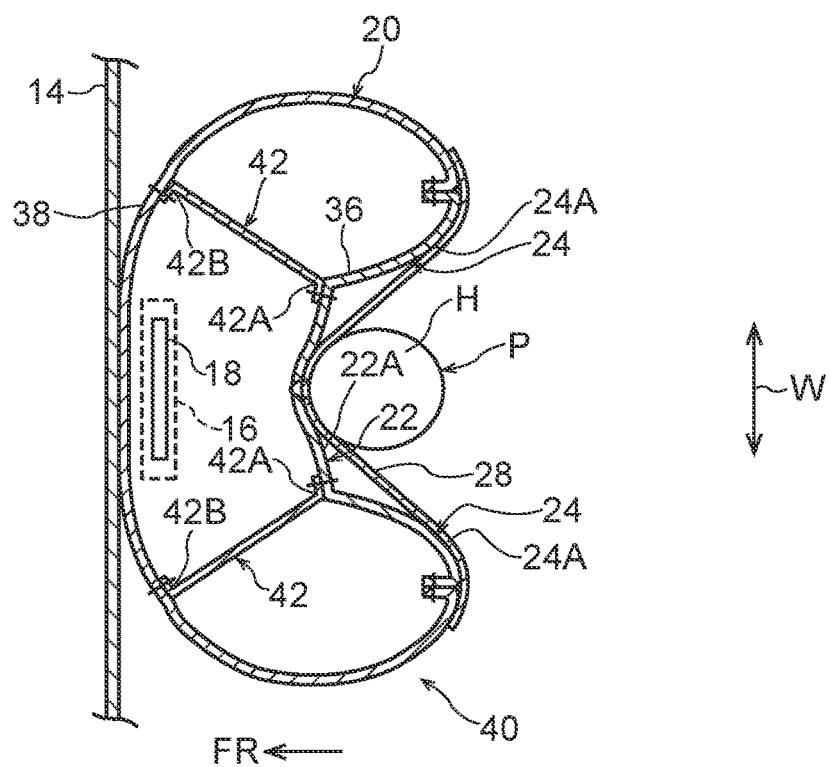
FIG. 11B is a horizontal sectional view showing, at the same cut position as in FIG. 10, a state that is after the passenger reaches the airbag at the time of a front collision, in the second embodiment.

In accordance with the present embodiment, in the same way as in the first embodiment, as shown in FIG. 11A, at the time of a front collision, the head portion H and the chest portion B (see FIG. 10) of the passenger P are first received at the connecting cloth 28. At this time, the left and right bulging end portions 24T of the airbag 20 are pulled toward the left-right direction central side, and therefore, the passenger P shifting left and right can be suppressed. Thereafter, as shown in FIG. 11B, when the head portion H and the chest portion B (see FIG. 10) of the passenger P reach the airbag 20 via the connecting cloth 28, the head portion H and the chest portion B of the passenger P are held by the reaction force that is due to the compression of the airbag 20.

Figure 12A:
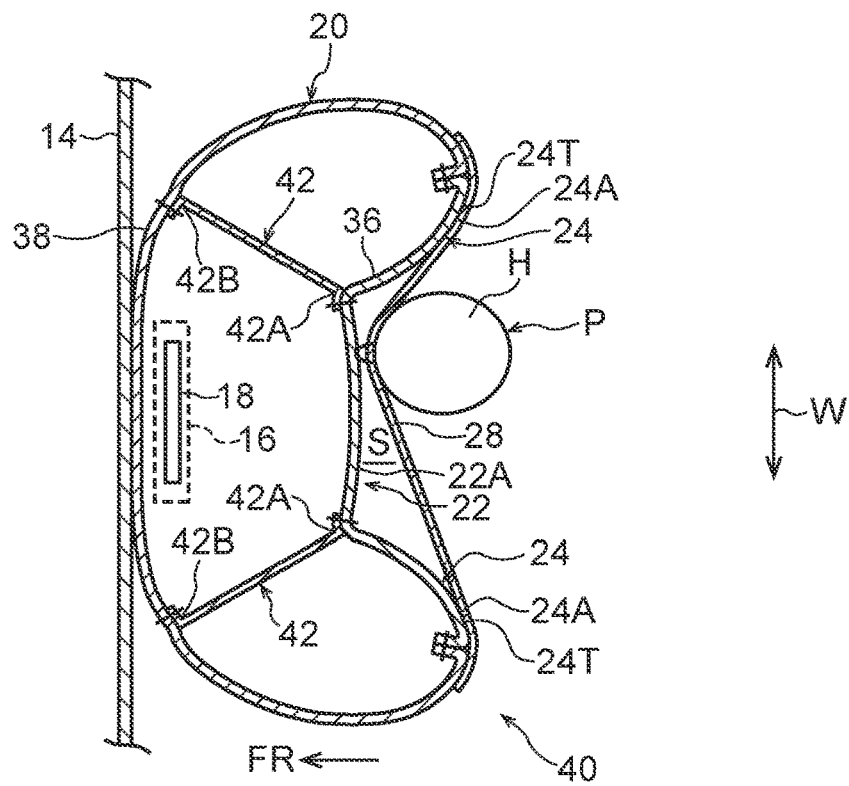
FIG. 12A is a horizontal sectional view showing, at the same cut position as in FIG. 10, a state in which the passenger abuts the connecting cloth at a position offset toward the right side at the time of a front collision, in the second embodiment.
Figure 12B:
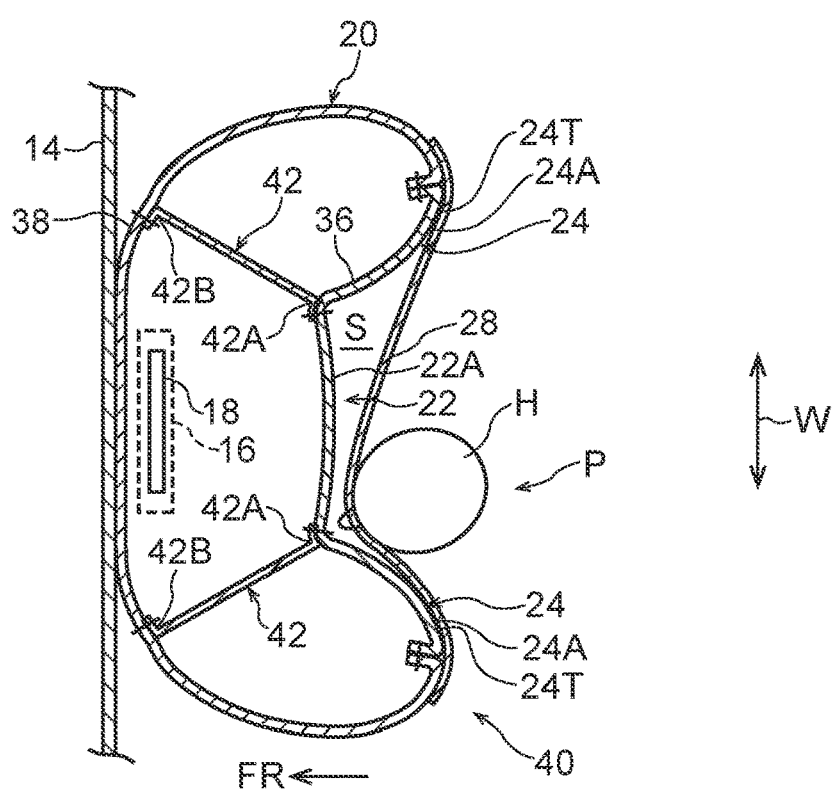
FIG. 12B is a horizontal sectional view showing, at the same cut position as in FIG. 10, a state in which the passenger moves in a left oblique direction and abuts the connecting cloth at the time of a front collision (the time of an oblique collision), in the second embodiment.

Further, in accordance with the present embodiment, in the same way as in the first embodiment, as shown in FIG. 12A, even in a case in which the automobile is involved in a front collision in the state which the passenger P is seated so as to be offset in the left-right direction, the head portion H and the chest portion B (see FIG. 10) of the passenger P are received by the connecting cloth 28 at the vehicle rear side of the space S that is formed between the connecting cloth 28 and the airbag 20. Further, as shown in FIG. 12B, even if, at the time of an oblique collision, the passenger P inertially moves obliquely with respect to the vehicle longitudinal direction, and the head portion H and the chest portion B of the passenger P abut the connecting cloth 28 so as to be offset toward the left or the right from the left-right direction central portion of the connecting cloth 28, in the same way as in the first embodiment, the head portion H and the chest portion B are received by the connecting cloth 28 at the vehicle rear side of the space S that is formed between the connecting cloth 28 and the airbag 20. Further, the bulging end portion 24T that is at the side toward which the passenger P has moved inertially (the left side of the vehicle in the drawing) is pulled toward the left-right direction central side, and therefore, it is difficult for the passenger P to come away from the airbag 20, and the passenger P is held stably.

Namely, in accordance with the present embodiment as well, operation and effects that are substantially similar to those of the above-described first embodiment are obtained. Further, in accordance with the present embodiment, even though the shapes of the top surface panel 32 and the bottom surface panel 34 are made to be simple shapes in which the both end sides of an oval shape are bent as shown in FIG. 3, the shape at the time of inflation and expansion of the airbag 20 that is shown in FIG. 10 is maintained stably by the pair of left and right cloth-like members 42. Namely, because there is no need to complicate the shapes of the top surface panel 32 and the bottom surface panel 34 that are shown in FIG. 3, the ease of fabricating the airbag 20 that is shown in FIG. 9 can be ensured.

Third Embodiment

An airbag device 50 for a front passenger seat relating to a third embodiment of the present disclosure is described next by using FIG. 13 and FIG. 14. As shown in these drawings, the present embodiment differs from the second embodiment with regard to the point that a connecting cloth 52 and a closing cloth 54 are provided instead of the connecting cloth 28 (see FIG. 9 and the like) of the second embodiment. The other structures are structures that are substantially similar to those of the second embodiment. Accordingly, structural portions that are substantially similar to those of the second embodiment are denoted by the same reference numerals, and description thereof is omitted. Note that illustration of the cloth-like members 42 is omitted in FIG. 13. Further, a method that is similar to that of the first embodiment is used as the method of folding the airbag 20.

Figure 14:
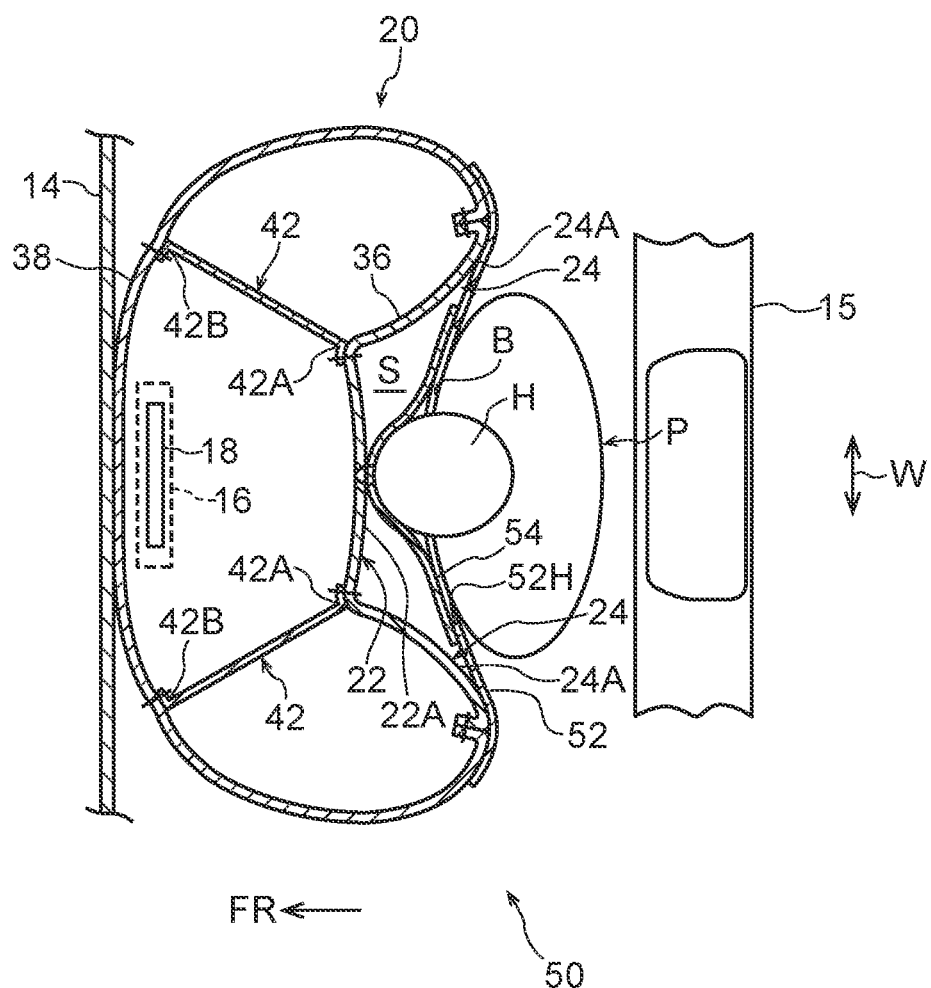
FIG. 14 is a cross-sectional view showing a state before a front collision in the third embodiment as a state cut along line 14L-14L of FIG. 13.

The connecting cloth 52 connects the regions that become the bulging end portion 24T (see FIG. 13) sides of the pair of second surfaces 24A in the inflated and deployed state of the airbag 20, and, at the time of a front collision including an oblique collision, expands so as to cover the range that is reached by the head portion H and the chest portion B of the passenger P of the front passenger seat 15 shown in FIG. 14. A hole portion 52H that is shown in FIG. 13 is formed so as to pass-through the connecting cloth 52 at the region corresponding to the head portion H of the passenger P of the front passenger seat 15. The closing cloth 54, which is formed of a material that stretches more easily than the connecting cloth 52, is pulled so as to close-off the hole portion 52H.

In accordance with the present embodiment, the following operation and effects are obtained in addition to the operation and effects of the second embodiment. Namely, at the time of a front collision, as shown in FIG. 14, the chest portion B of the passenger P is received by the connecting cloth 52, and the head portion H of the passenger P is received by the closing cloth 54 that is formed of a material that stretches more easily than the connecting cloth 52. The head portion H of the passenger P is held by the closing cloth 54, which stretches more easily than the connecting cloth 52, so as to be enveloped therein while impact to the head portion H is mitigated. Therefore, the ability to hold the head portion H of the passenger P is improved, and rotation of the head portion H of the passenger P also can be suppressed. As described above, in the present embodiment, at the time of a front collision of the vehicle, the head portion H of the passenger P can be held at a low load by the closing cloth 54 while the chest portion B of the passenger P is held securely by the connecting cloth 52.

Fourth Embodiment

Figure 15:
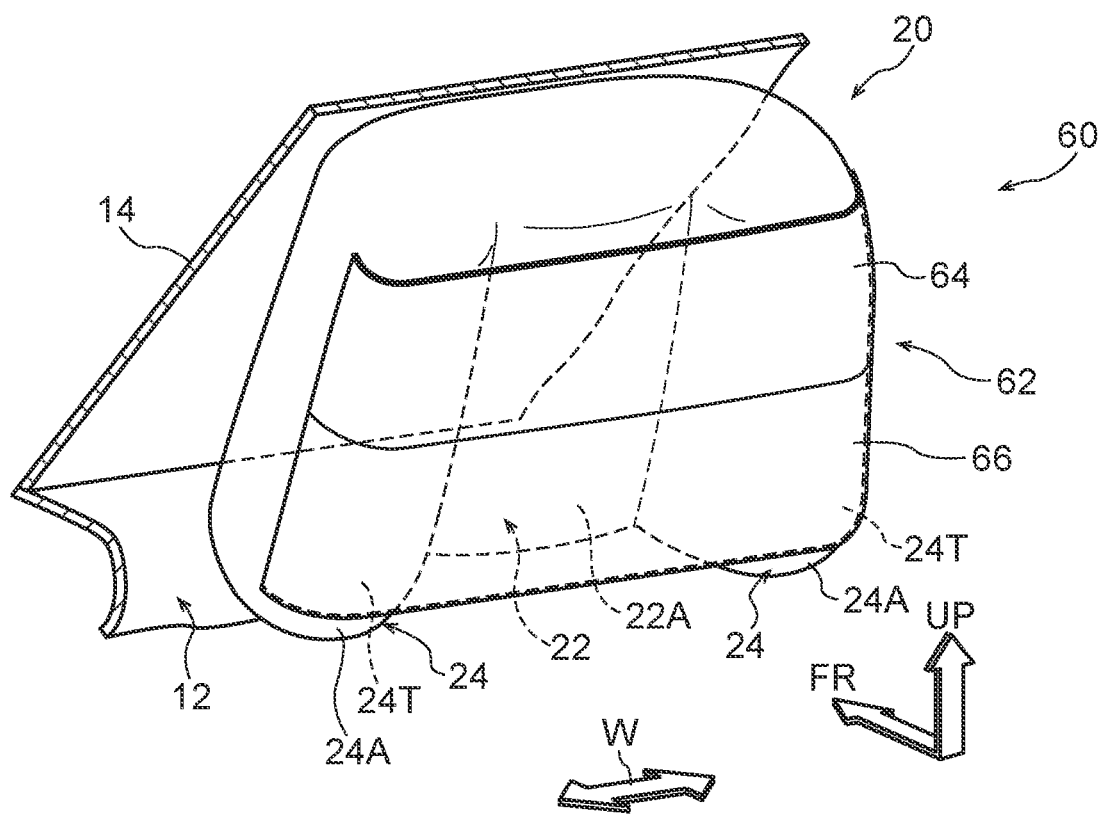
FIG. 15 is a perspective view showing a state in which the airbag of an airbag device for a front passenger seat relating to a fourth embodiment of the present disclosure has inflated and deployed.

An airbag device 60 for a front passenger seat relating to a fourth embodiment of the present disclosure is described next by using FIG. 15 and FIG. 16. As shown in these drawings, the present embodiment differs from the second embodiment with regard to the point that a connecting cloth 62 whose upper portion and lower portion are formed of respectively different materials is provided instead of the connecting cloth 28 (see FIG. 9 and the like) of the second embodiment. The other structures are structures that are substantially similar to those of the second embodiment. Accordingly, structural portions that are substantially similar to those of the second embodiment are denoted by the same reference numerals, and description thereof is omitted. Note that illustration of the cloth-like members 42 (refer to FIG. 9 and the like) is omitted in FIG. 15 and FIG. 16. Further, a method that is similar to that of the first embodiment is used as the method of folding the airbag 20.

Figure 16:
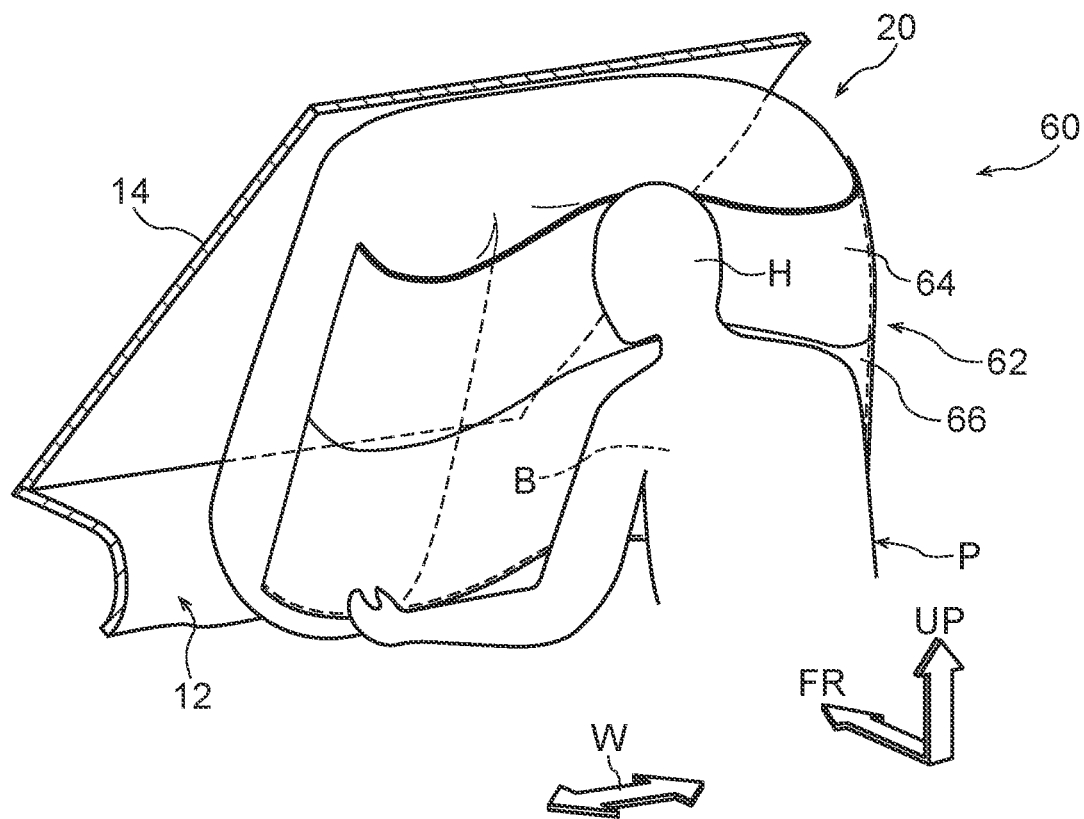
FIG. 16 is a cross-sectional view showing a state before a front collision in the fourth embodiment.

The connecting cloth 62 connects the regions that become the bulging end portion 24T (see FIG. 15) sides of the pair of second surfaces 24A in the inflated and deployed state of the airbag 20, and, at the time of a front collision including an oblique collision, expands so as to cover the range that is reached by the head portion H and the chest portion B of the passenger P shown in FIG. 16 of the front passenger seat 15 (see FIG. 1). At the connecting cloth 62, an upper side region 64, which is disposed at a height position that the head portion H of the passenger P of the front passenger seat 15 (see FIG. 1) reaches at the time of a front collision shown in FIG. 16, is formed of a cloth material that stretches more easily than a lower side region 66 that is disposed at a height position that the chest portion B of the passenger P of the front passenger seat 15 (see FIG. 1) reaches at the time of a front collision. The lower end of the upper side region 64 and the upper end of the lower side region 66 are sewn together as an example.

In accordance with the present embodiment, the following operation and effects are obtained in addition to the operation and effects of the second embodiment. Namely, at the time of a front collision, the chest portion B of the passenger P is held securely by the lower side region 66 that is structured by a cloth material that is more difficult to stretch than the upper side region 64 at the connecting cloth 62. Further, the head portion H of the passenger P is held, while impact thereto is mitigated, by the upper side region 64 that is structured of a cloth material that is easier to stretch than the lower side region 66 at the connecting cloth 62. Namely, in the present embodiment, at the time of a front collision of the vehicle, the head portion H of the passenger P can be held at a low load by the upper side region 64 of the connecting cloth 62, while the chest portion B of the passenger P is held securely by the lower side region 66 of the connecting cloth 62.

Fifth Embodiment

An airbag device 70 for a front passenger seat relating to a fifth embodiment of the present disclosure is described next by using FIGS. 17A and 17B. As shown in these drawings, the present embodiment differs from the second embodiment with regard to the point that a pair of left and right cloth-like members 72 for restricting deformation are provided instead of the pair of left and right cloth-like members 42 (see FIG. 10) of the second embodiment.

The other structures are structures that are basically similar to those of the second embodiment. However, to describe them in further detail, in the present embodiment, a top surface panel and a bottom surface panel, which are shapes that approximately correspond to the outer shape of the airbag 20 shown in FIGS. 17A and 17B are used (not illustrated) instead of the top surface panel 32 and the bottom surface panel 34 (refer to FIG. 4A for the both) in the second embodiment. However, the airbag 20 and structural portions thereof are denoted by the same reference numerals as in the second embodiment for convenience. Note that, in the same way as in the second embodiment, at the airbag 20, as seen in a vehicle plan view, the thickness dimension 24L of the second structural portions 24 in the inflated and deployed state is set to be smaller than the thickness dimension 22L of the left-right direction central portion of the first structural portion 22 in the inflated and deployed state. Further, other structural portions that are substantially similar to those of the second embodiment also are denoted by the same reference numerals, and description thereof is omitted. Further, a method that is similar to that of the first embodiment is used as the method of folding the airbag 20.

The pair of left and right cloth-like members 72 connect the reverse surface sides of the boundary portions between the first surface 22A and the second surfaces 24A at the front surface panel 36, and the inner surface of the back surface panel 38, and are configured to extend along the vehicle longitudinal direction in the inflated and deployed state of the airbag 20. At the cloth-like members 72, end portions 72A at the vehicle rear side are fixed by sewing to the front surface panel 36, and end portions 72B at the vehicle front side are fixed by sewing to the back surface panel 38. Further, in the same way as the cloth-like members 42 of the second embodiment (see FIG. 9), the cloth-like members 72 are disposed in a vertical direction range that excludes the upper end side and the lower end side of the airbag 20 interior. The cloth-like members 72 are fabricated by using the same material as the airbag 20 as an example.

In accordance with the present embodiment, operation and effects that are substantially the same as those of the second embodiment are obtained, and, also at the time of an oblique collision, the head portion H and the chest portion B of the passenger P are received by the connecting cloth 28, and impact to the head portion H and the chest portion B of the passenger P can be mitigated. Further, in the present embodiment, at the time of inflation and expansion of the airbag 20, the left-right direction intermediate portion of the front surface panel 36 and the left-right direction intermediate portion of the back surface panel 38 become shapes that are relatively flat and that run along the left-right direction, due to the pair of left and right cloth-like members 72. Therefore, at the time of inflation and expansion of the airbag 20, the range, at which the thickness of the first structural portion 22 of the airbag 20 is approximately uniform, is ensured to be long in the vehicle transverse direction, and the range, at which the interval between the connecting cloth 28 and the first surface 22A of the first structural portion 22 of the airbag 20 is approximately uniform, is ensured to be long in the vehicle transverse direction.

Figure 17A:
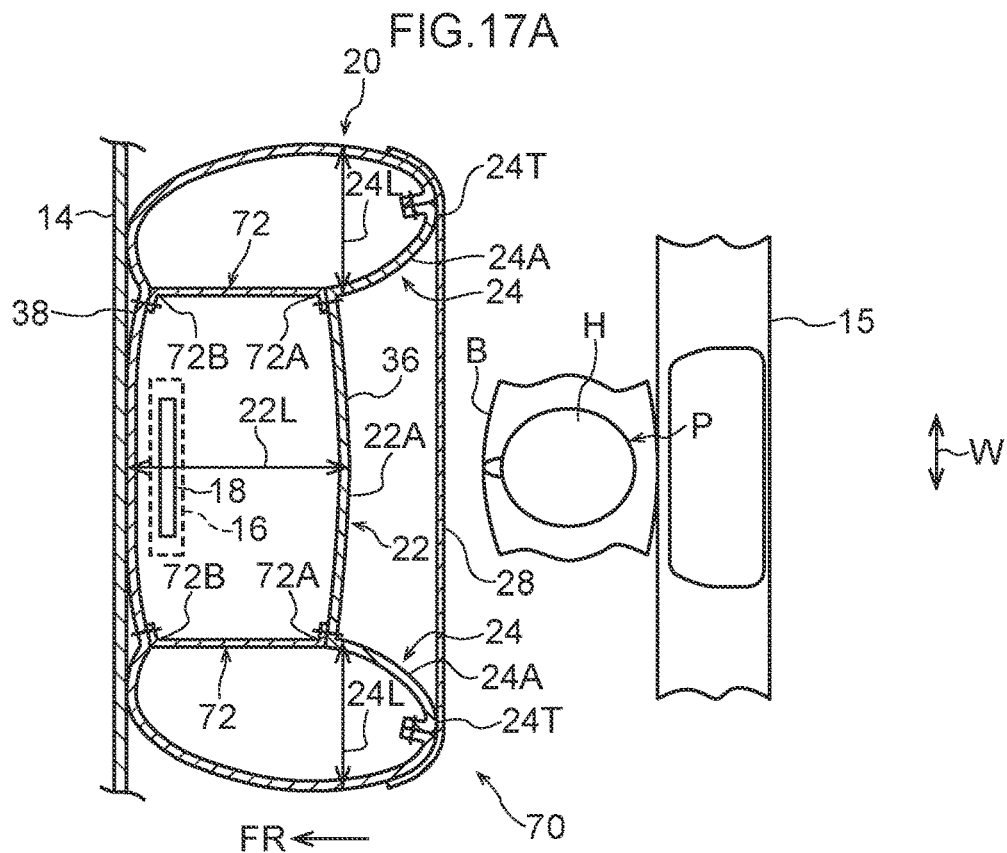
FIG. 17A is a horizontal sectional view that corresponds to FIG. 3 and shows a state in which the airbag of an airbag device for a front passenger seat relating to a fifth embodiment of the present disclosure has inflated and deployed.
Figure 17B:
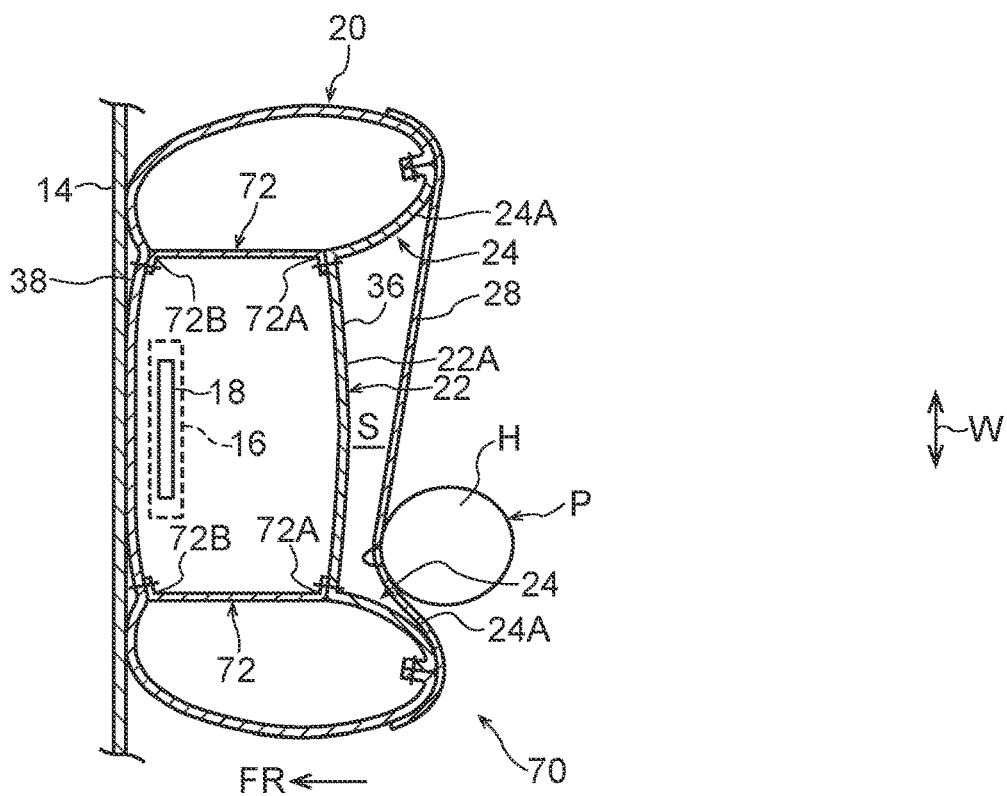
FIG. 17B is a horizontal sectional view showing, at the same cut position as in FIG. 17A, a state in which the passenger abuts the connecting cloth at a position offset toward the left side at the time of a front collision, in the fifth embodiment.

Due thereto, the effect of mitigating impact in a case in which the passenger P is received at the left-right direction central portion of the connecting cloth 28, and the effect of mitigating impact in a case in which the passenger P is received at nearer to either of the left or right ends of the connecting cloth 28 as shown in FIG. 17B, are approximately the same. Namely, in the present embodiment, dispersion in the effects of impact mitigation depending on the left-right direction position at which the passenger P abuts the connecting cloth 28 can be suppressed more.

Sixth Embodiment

Figure 18:
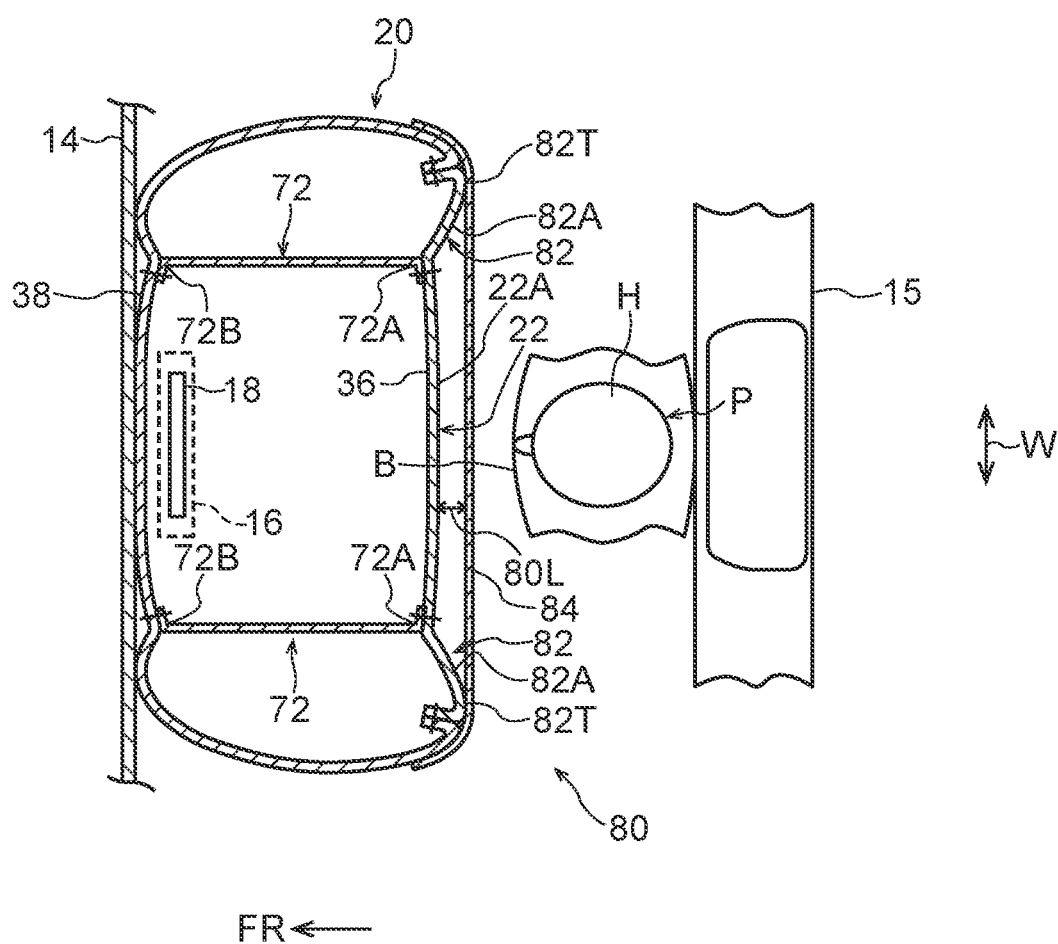
FIG. 18 is a horizontal sectional view that corresponds to FIG. 3 and shows a state in which the airbag of an airbag device for a front passenger seat relating to a sixth embodiment of the present disclosure has inflated and deployed.
Figure 19:
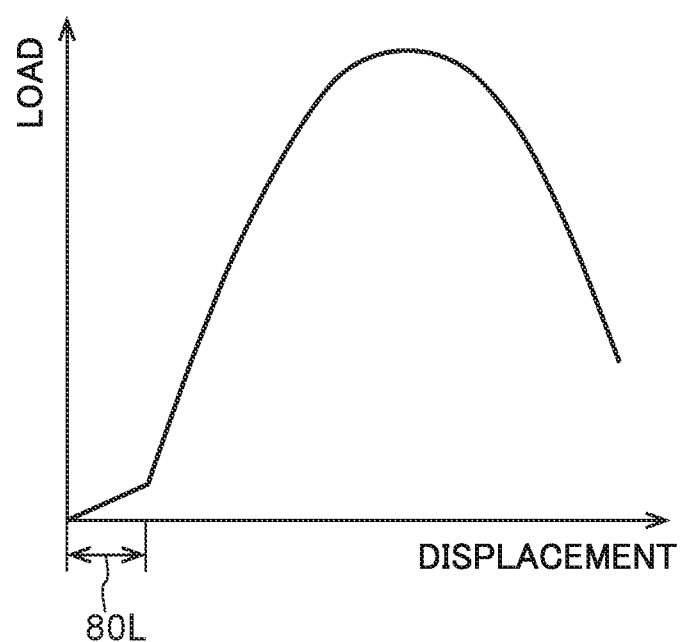
FIG. 19 is a graph showing the relationship between load and displacement at the time of a front collision in the sixth embodiment.

An airbag device 80 for a front passenger seat relating to a sixth embodiment of the present disclosure is described next by using FIG. 18 and FIG. 19. As shown in FIG. 18, the present embodiment differs from the fifth embodiment with regard to the point that second structural portions 82 are provided instead of the second structural portions 24 of the fifth embodiment (see FIGS. 17A and 17B), and the point that a connecting cloth 84 is provided instead of the connecting cloth 28 of the fifth embodiment (see FIGS. 17A and 17B).

The other structures are structures that are basically similar to those of the fifth embodiment. However, looking at them in further detail, in the present embodiment, the first structural portion 22 is set to have a thickness in the vehicle longitudinal direction that is thicker than that of the first structural portion 22 of the fifth embodiment (see FIGS. 17A and 17B), and further, the cloth-like members 72 are set to have longer lengths than the lengths in the vehicle longitudinal direction of the cloth-like members 72 of the fifth embodiment (see FIGS. 17A and 17B). However, these are denoted by the same reference numerals as in the fifth embodiment for convenience. The other structural portions that are substantially similar to those of the fifth embodiment also are denoted by the same reference numerals, and description thereof is omitted. Note that, although not illustrated, a top surface panel and a bottom surface panel, which are shapes that approximately correspond to the outer shape of the airbag 20 shown in FIG. 18, are used for the top surface panel that corresponds to the top surface panel 32 of FIG. 4A and the bottom surface panel that corresponds to the bottom surface panel 34 of FIG. 4A. Further, a method that is similar to that of the first embodiment is used as the method of folding the airbag 20.

The second structural portions 82 are formed in continuation with the left and right both sides of the first structural portion 22. A pair of second surfaces 82A, which, in the inflated and deployed state, bulge further toward the front passenger seat 15 side than the first surface 22A and move apart from one another, are formed at the second structural portions 82. The second structural portions 82 are structured substantially similarly to the second structural portions 24 of the fifth embodiment (see FIGS. 17A and 17B) except for the point that, at the second structural portions 82, the amount of bulging toward the front passenger seat 15 side in the inflated and deployed state is smaller than that of the second structural portions 24 of the fifth embodiment (see FIGS. 17A and 17B). In the drawing, the distance between the first structural portion 22 and the connecting cloth 84 in the inflated and deployed state is denoted by reference numeral 80L. Note that, in the present embodiment, the airbag 20 that has the first structural portion 22 and the second structural portions 82 differs from the airbag 20 of the fifth embodiment (see FIGS. 17A and 17B) with regard to the above-described points, but, for convenience, the same reference numerals as in the fifth embodiment are used, and description is omitted.

The connecting cloth 84 is structured of a cloth material that stretches more easily than the connecting cloth 28 of the fifth embodiment (see FIGS. 17A and 17B). In the same way as the connecting cloth 28 of the fifth embodiment (see FIGS. 17A and 17B), the connecting cloth 84 connects the regions that become bulging end portion 82T sides of the pair of second surfaces 82A in the inflated and deployed state of the airbag 20, and, at the time of a front collision including an oblique collision, is deployed so as to cover the range that is reached by the head portion H and the chest portion B of the passenger P of the front passenger seat 15.

In the present embodiment, in the same way as in the other embodiments, also at the time of an oblique collision, the head portion H and the chest portion B of the passenger P are received at the connecting cloth 84, and the impact to the head portion H and the chest portion B of the passenger P can be mitigated. Further, in the present embodiment, at the time of a front collision, the head portion H of the passenger P of the front passenger seat 15 is held, while impact thereto is mitigated, by the connecting cloth 84 that stretches more easily than the base cloth that structures the airbag 20. As shown by the graph of FIG. 19 that illustrates the relationship between displacement and load, until the head portion H of the passenger P abuts the airbag 20 via the connecting cloth 84, the load rises relatively gradually (refer to section 80L), and thereafter, the load increases due to the compression reaction force of the airbag 20. Namely, in accordance with the present embodiment, at the time of a front collision of the vehicle, the initial load that is inputted to the head portion H of the passenger P can be suppressed.

Seventh Embodiment

An airbag device 90 for a front passenger seat relating to a seventh embodiment of the present disclosure is described next by using FIG. 20 through FIG. 22. As shown in FIG. 21, the present embodiment differs from the second embodiment with regard to the point that second structural portions 100 are formed instead of the second structural portions 24 (see FIG. 10) by providing plural pairs of left and right cloth-like members 92, 94, 96 for deformation restriction instead of the pair of left and right cloth-like members 42 in the second embodiment (see FIG. 10), and the point that a connecting cloth 110 is provided instead of the connecting cloth 28 of the second embodiment (see FIG. 10). The other structures are structures that are substantially similar to those of the second embodiment. Accordingly, structural portions that are substantially similar to those of the second embodiment are denoted by the same reference numerals, and description thereof is omitted. Note that, although not illustrated, a top surface panel and a bottom surface panel, which are shapes that approximately correspond to the outer shape of the airbag 20 shown in FIG. 21A, are used as a top surface panel that corresponds to the top surface panel 32 of FIG. 4A and a bottom surface panel that corresponds to the bottom surface panel 34 of FIG. 4A. Further, a method that is similar to that of the first embodiment is used as the method of folding the airbag 20.

The plural (three in the present embodiment) cloth-like members 92, 94, 96 that connect the front surface panel 36 and the back surface panel 38 are provided respectively at the left and right both sides of the interior of the airbag 20. These plural cloth-like members 92, 94, 96 are set such that, among the regions at the left and right both sides of the front surface panel 36 in the inflated and deployed state of the airbag 20, the regions, which are disposed at the vehicle front side of the connecting cloth 110 so as to be apart from the connecting cloth 110, become stepped shapes that run along a pair of virtual straight lines L that are inclined from a central portion 22X of the first structural portion 22 toward the front passenger seat 15 side while heading apart from one another as seen in a vehicle plan view.

The second structural portions 100, which include these step-shaped regions and are formed in continuation with the left and right both sides of the first structural portion 22, are provided. A pair of second surfaces 100A, which, in the inflated and deployed state, bulge toward the front passenger seat 15 side more than the first surface 22A and move apart from one another, are formed at the second structural portions 100. Note that, in the present embodiment, the airbag 20 that has the first structural portion 22 and the second structural portions 100 differs from the airbag 20 of the second embodiment (see FIG. 9) with regard to the above-described points, but, for convenience, is denoted by the same reference numerals as in the second embodiment, and description thereof is omitted.

The plural cloth-like members 92, 94, 96 extend in a radial form from the back surface panel 38 side. Closed cross-sectional portions 102, 104, 106 that are partitioned by the cloth-like members 92, 94, 96 are formed at the second structural portions 100 that are at the left and right both sides of the interior of the airbag 20.

Figure 20:
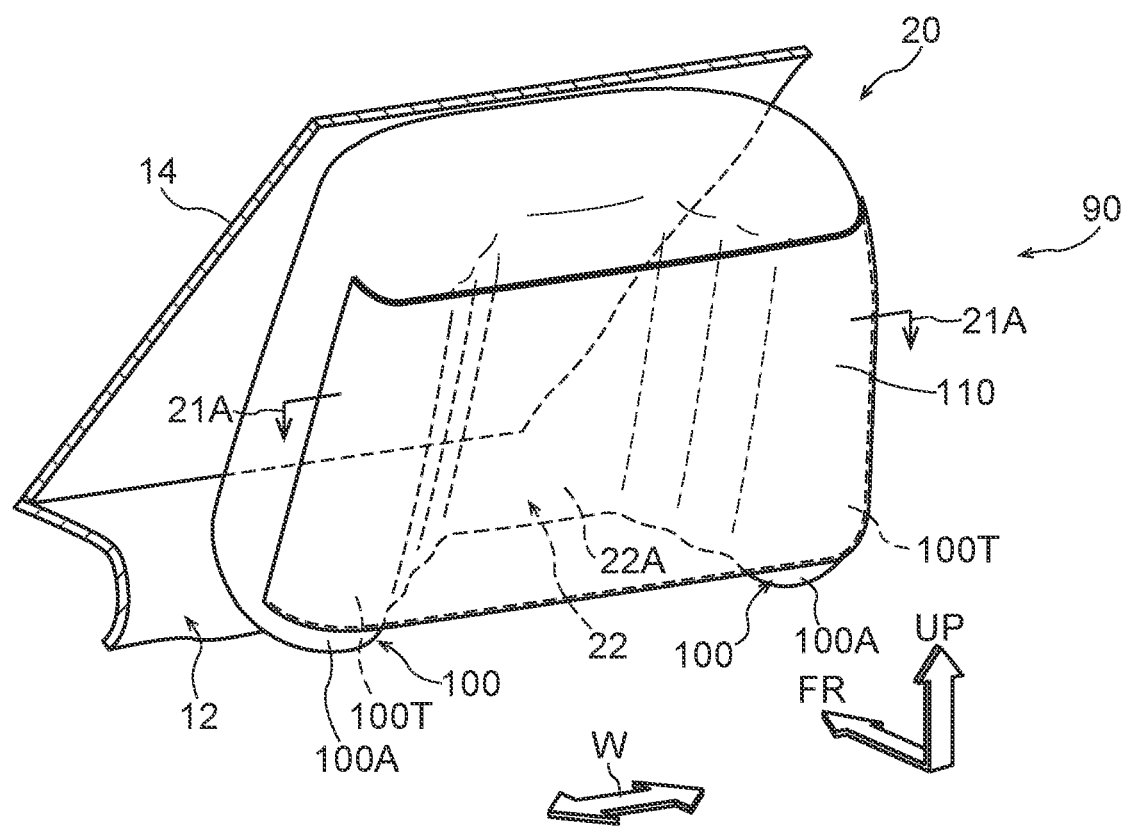
FIG. 20 is a perspective view showing a state in which the airbag of an airbag device for a front passenger seat relating to a seventh embodiment of the present disclosure has inflated and deployed.
Figure 21A:
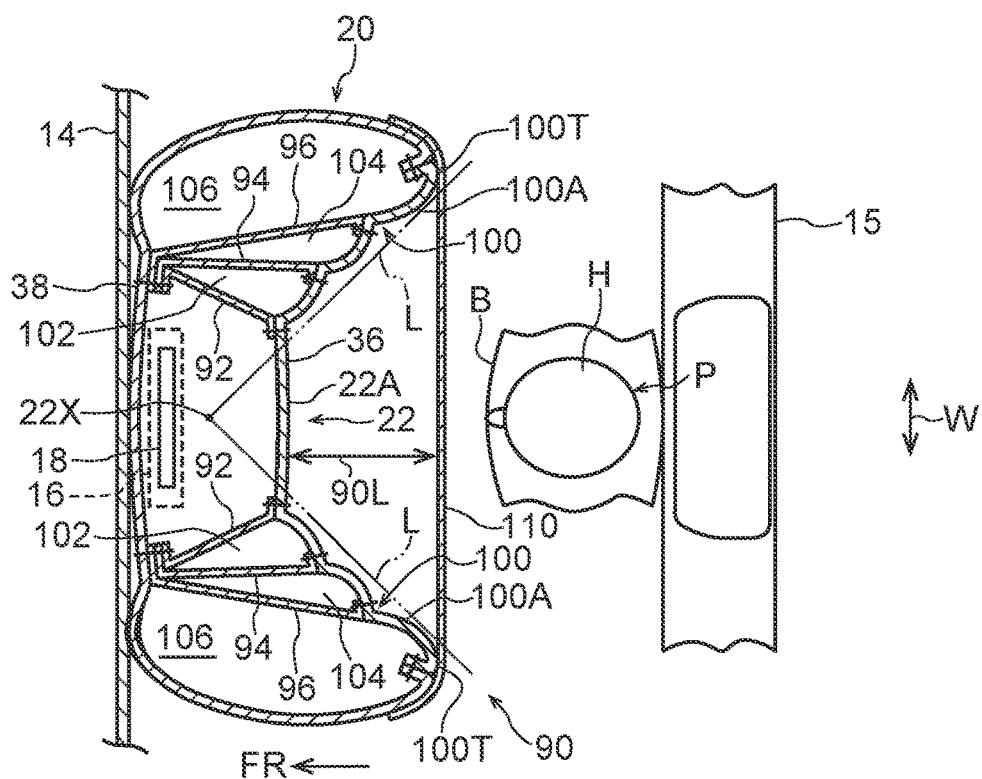
FIG. 21A is a cross-sectional view showing the state cut along line 21A-21A of FIG. 20.

Further, the connecting cloth 110 that is shown in FIG. 20 is structured of a cloth material that is more difficult to stretch than the connecting cloth 28 of the second embodiment (see FIG. 10). As an example, in the present embodiment, in a case in which the passenger P pushes the connecting cloth 110 toward the front windshield 14 side at the time of a front collision of the vehicle, the amount by which the connecting cloth 110 stretches is set to be smaller than the amount of displacement (the amount of bending) of bulging end portions 100T of the pair of second surfaces 100A of the second structural portions 100 toward the inner side. In the same way as the connecting cloth 28 in the second embodiment (see FIG. 10), the connecting cloth 110 connects the regions that become the bulging end portion 100T sides of the pair of second surfaces 100A in the inflated and deployed state of the airbag 20, and, at the time of a front collision including an oblique collision, is deployed so as to cover the range that is reached by the head portion H and the chest portion B of the passenger P of the front passenger seat 15 shown in FIG. 21A. Distance 90L between the first structural portion 22 and the connecting cloth 110 is set to be longer than in the cases of the other embodiments.

Figure 21B:
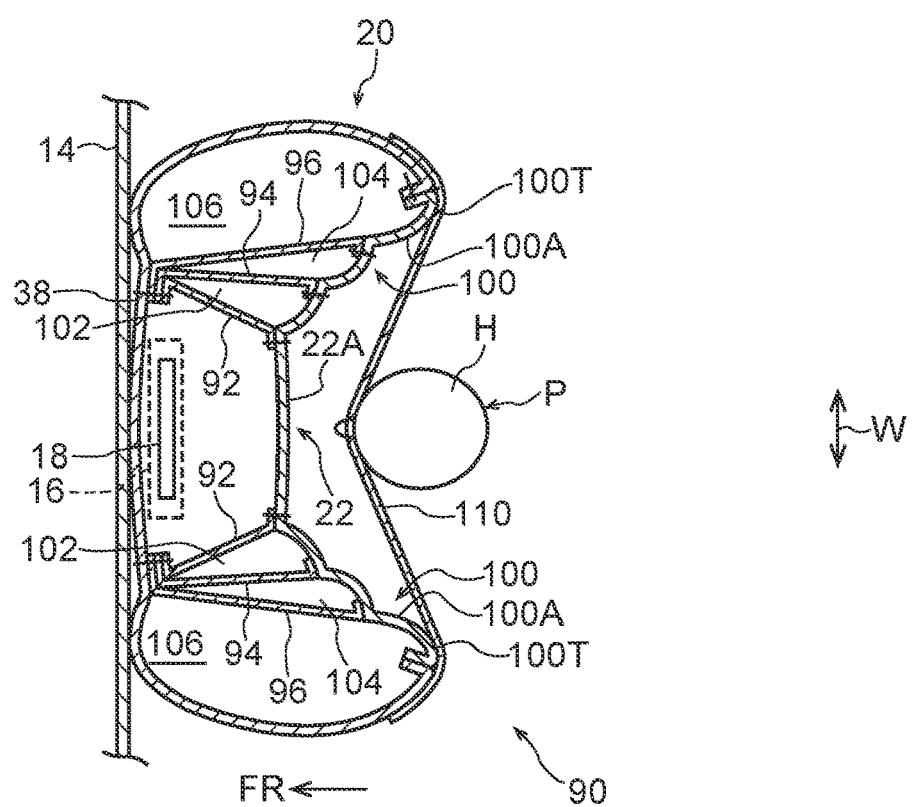
FIG. 21B is a horizontal sectional view showing, at the same cut position as in FIG. 21A, the state at the time of a front collision, in the seventh embodiment.

In the present embodiment, in the same way as in the other embodiments, also at the time of an oblique collision, the head portion H and the chest portion B of the passenger P are received by the connecting cloth 110, and the impact to the head portion H and the chest portion B of the passenger P can be mitigated. Further, in the present embodiment, as shown in FIG. 21B, in a case in which the passenger P abuts the connecting cloth 110, and the bulging end portions 100T of the left and right second structural portions 100 of the airbag 20 receive load from the connecting cloth 110, at the airbag 20, the respective closed cross-sectional portions 102, 104, 106, which are partitioned by the cloth-like members 92, 94, 96 at the left and right second structural portions 100, start to be compressed toward the side of the central portion 22X of the first structural portion 22, more than the bulging end portions 100T of the left and right second structural portions 100 start to bend toward the inner side. Therefore, even if the connecting cloth 110 is pushed by the passenger P, it is difficult for the left and right second structural portions 100 of the airbag 20 to bend toward the inner side. In this way, in a case in which the connecting cloth 110 is pushed by the head portion H and the chest portion B (see FIG. 21A) at the time of a front collision of the vehicle, bending of the left and right second structural portions 100 of the airbag 20 toward the inner side is suppressed. Due thereto, the connecting cloth 110 reaching the airbag 20 early can be suppressed, while the desired reaction force is obtained.

Figure 22:
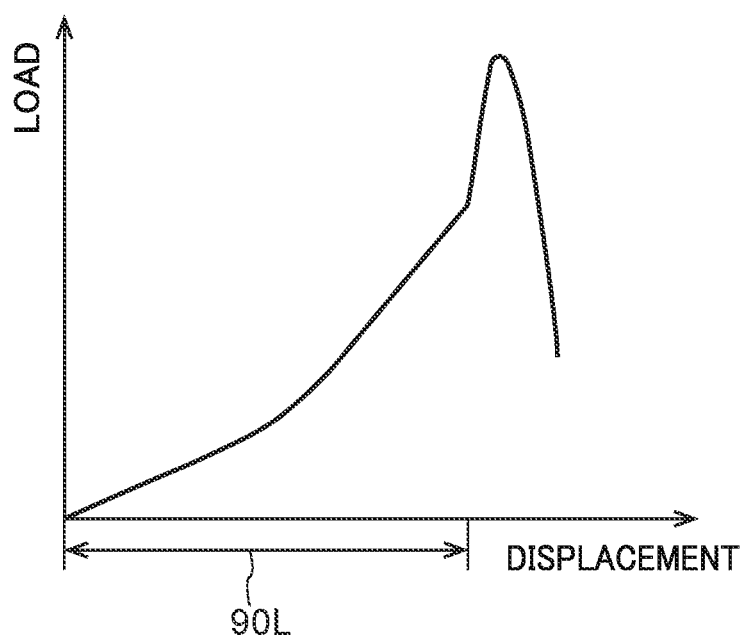
FIG. 22 is a graph showing the relationship between load and displacement at the time of a front collision in the seventh embodiment.

As shown by the graph of FIG. 22 that illustrates the relationship between displacement and load, until the passenger P abuts the airbag 20 via the connecting cloth 110, the load rises gradually (see section 90L). Further, in the case of a high-speed collision or in a case in which the passenger P is wearing a helmet or the like, the passenger P abuts the airbag 20 via the connecting cloth 110 (i.e., the displacement goes beyond the section 90L), but, in such a case, the passenger P is held at a high load by the airbag 20. As a result, the passenger P strongly hitting the front windshield 14 can be suppressed.

Supplemental Description of Embodiments

Note that, as a modified example of the above-described embodiments, there can be employed a structure in which the airbag is set such that, as seen in a vehicle plan view, the thickness dimension of the second structural portions in the inflated and deployed state is the same as or is slightly larger than the thickness dimension of the left-right direction central portion of the first structural portion in the inflated and deployed state.

Further, in the above-described embodiments, the airbag is structured to have the top surface panel, the bottom surface panel, the front surface panel and the back surface panel. However, the airbag may have a structure other than that described above, such as, for example, the airbag may be structured to have a top surface panel, a bottom surface panel, and a peripheral surface panel that vertically connects this top surface panel and this bottom surface panel.

Note that the above-described embodiments and the above-described modified examples may be implemented by being combined appropriately.

Although examples of the present disclosure have been described above, the present disclosure is not limited to the above, and, other than the above, can of course be implemented by being modified in various ways within a scope that does not depart from the gist thereof.

What is claimed is:

1. An airbag device for a front passenger seat, comprising:
an inflator that is operable to generate gas; and
an airbag for a front passenger seat that is accommodated in a folded-up state, and that receives a supply of gas generated by the inflator and is configured to inflate and deploy at a front side of a front passenger seat at a height position that corresponds to at least a region from a head portion to a chest portion of a passenger in the front passenger seat, the airbag including:
  a first structural portion that structures a left-right direction intermediate portion of the airbag and at which is formed a first surface that faces the front passenger seat in an inflated and deployed state;
  second structural portions that are formed in continuation with both left and right sides of the first structural portion and at which are formed a pair of respective second surfaces that, in an inflated and deployed state, bulge further toward the front passenger seat than the first surface and move apart from one another;
  a top surface portion that, in the inflated and deployed state, includes a top surface panel at which first regions, which are at both left and right end sides with respect to a left-right direction intermediate portion of the top surface panel as seen in plan view from a top of the airbag, are bent toward a same side of the airbag and are disposed to bulge toward the front passenger seat;
  a bottom surface portion that, in the inflated and deployed state, includes a bottom surface panel (i) at which second regions, which are at both left and right end sides with respect to a left-right direction intermediate portion of the bottom surface panel as seen in plan view from a bottom of the airbag, are bent toward the same side of the airbag and are disposed to bulge toward the front passenger seat and (ii) in which mounting holes for mounting the inflator, or gas supply holes that are connected to the inflator, are formed to pass through;
  a front surface portion that, in the inflated and deployed state, includes a front surface panel that is disposed at a front passenger seat side of the airbag and that is formed in a rectangular shape; and
  a back surface panel that is disposed at a front windshield side of the airbag in an inflated and deployed state and that is formed in a rectangular shape having a larger left-right direction dimension than the front surface panel, wherein:
an outer peripheral edge portion of the top surface panel and respective upper end edge portions of the front surface panel and the back surface panel are sewn together,
right end edge portions of the front surface panel and right end edge portions of the back surface panel are sewn together,
left end edge portions of the front surface panel and left end edge portions of the back surface panel are sewn together,
an outer peripheral edge portion of the bottom surface panel and respective lower end edge portions of the front surface panel and the back surface panel are sewn together, and
a connecting cloth is configured to connect regions that become bulging end portion sides of the pair of the respective second surfaces in an inflated and deployed state of the airbag, and which, at a time of a front collision including an oblique collision, is configured to be deployed to cover a range that is reached by the head portion and the chest portion of the passenger in the front passenger seat.

2. The airbag device for the front passenger seat of claim 1, wherein, at the airbag, as seen in a vehicle plan view, a thickness dimension of the second structural portions in an inflated and deployed state is smaller than a thickness dimension of a left-right direction central portion of the first structural portion in an inflated and deployed state.

3. The airbag device for the front passenger seat of claim 1, wherein a deformation suppressing member, which suppresses deformation of a left-right direction intermediate portion of the front surface panel toward the front passenger seat side due to pressure from gas supplied into the airbag, is mounted at a reverse surface of the left-right direction intermediate portion of the front surface panel.

4. The airbag device for the front passenger seat of claim 1, wherein:
a pair of left and right cloth-like members are configured to connect an inner surface of the back surface panel with reverse surface sides of border portions between the first surface and the second surfaces at the front surface panel; and
the pair of left and right cloth-like members extend toward a vehicle front side while respectively moving apart from one another at an incline, in an inflated and deployed state of the airbag.

5. The airbag device for the front passenger seat of claim 1, wherein:
a pair of left and right cloth-like members configured to connect an inner surface of the back surface panel with reverse surface sides of border portions between the first surface and the second surfaces at the front surface panel; and the pair of left and right cloth-like members extend along a vehicle longitudinal direction, in an inflated and deployed state of the airbag.

6. The airbag device for the front passenger seat of claim 1, wherein:
- a plurality of cloth-like members that connect the front surface panel with the back surface panel are provided at both left and right sides of an interior of the airbag, respectively; and
- the plurality of cloth-like members are configured such that, among regions at both left and right sides of the front surface panel in an inflated and deployed state of the airbag, regions that are disposed at a vehicle front side of the connecting cloth and apart from the connecting cloth configure stepped shapes that run along a pair of virtual straight lines that extend from a central portion of the first structural portion toward the front passenger seat side of the airbag while moving apart from one another as seen in a vehicle plan view.

7. The airbag device for the front passenger seat of claim 1, wherein a hole portion is configured to pass through the connecting cloth at a region corresponding to the head portion of the passenger in the front passenger seat, and a closing cloth, which is formed of a material that stretches more easily than the connecting cloth, is attached to close off the hole portion.

8. The airbag device for the front passenger seat of claim 1, wherein, at the connecting cloth, an upper side region, which is configured to be disposed at a height position that the head portion of the passenger in the front passenger seat reaches at a time of a front collision, is formed of a cloth material that stretches more easily than a lower side region that is configured to be disposed at a height position that the chest portion of the passenger in the front passenger seat reaches at a time of a front collision.

9. The airbag device for the front passenger seat of claim 1, wherein the connecting cloth is formed of a cloth material that stretches more easily than a base cloth of which the airbag is formed.

10. A method of folding the airbag that is provided at the airbag device for the front passenger seat of claim 1, the method comprising:
- a first step of folding, a plurality of times, left and right end portion sides of the airbag, which is in a state before folding, toward a left-right direction central side at fold lines that run along an airbag vertical direction, to fold the airbag inward with a side that faces the front passenger seat in an inflated and deployed state of the airbag being an inner side; and
- a second step of folding the airbag, after the first step, in a form of a roll from an upper edge side toward a lower edge side such that a side at which a pair of left and right folded portions appear to be lined up is an inner side.

* * * * *